United States Patent
Okura et al.

(10) Patent No.: US 11,336,857 B2
(45) Date of Patent: May 17, 2022

(54) SOLID-STATE IMAGING DEVICE, METHOD FOR DRIVING SOLID-STATE IMAGING DEVICE, AND ELECTRONIC APPARATUS

(71) Applicants: Brillnics Japan Inc., Tokyo (JP); THE RITSUMEIKAN TRUST, Kyoto (JP)

(72) Inventors: Shunsuke Okura, Tokyo (JP); Kenichiro Ishikawa, Tokyo (JP); Masayoshi Shirahata, Shiga (JP); Takeshi Fujino, Shiga (JP); Mitsuru Shiozaki, Shiga (JP); Takaya Kubota, Shiga (JP)

(73) Assignees: BRILLNICS JAPAN INC., Tokyo (JP); THE RITSUMEIKAN TRUST, Kyoto (JP)

( * ) Notice: Subject to any disclaimer, the term of this patent is extended or adjusted under 35 U.S.C. 154(b) by 240 days.

(21) Appl. No.: 16/809,048

(22) Filed: Mar. 4, 2020

(65) Prior Publication Data
US 2020/0288078 A1    Sep. 10, 2020

(30) Foreign Application Priority Data
Mar. 5, 2019    (JP) .............................. JP2019-039240

(51) Int. Cl.
*H04N 5/378* (2011.01)
*G06F 7/58* (2006.01)
(Continued)

(52) U.S. Cl.
CPC ............ *H04N 5/378* (2013.01); *G06F 7/588* (2013.01); *H01L 27/1461* (2013.01);
(Continued)

(58) Field of Classification Search
None
See application file for complete search history.

(56) References Cited

U.S. PATENT DOCUMENTS 7,894,600 B2 *  2/2011  Sato ..................... G06F 21/32
                                                    380/44
2012/0303690 A1  11/2012  Fukushima et al.
(Continued)

FOREIGN PATENT DOCUMENTS

EP    1263208 A1    12/2002
FR    2681491 A1    3/1993
(Continued)

OTHER PUBLICATIONS

Okura et al., A Proposal of PUF Utilizing Pixel Variations in the CMOS Image Sensor, 2017 Symposium on Cryptography and Information Security, The Institute of Electronics, Information and Communication Engineers, Jan. 24, 2017, pp. 1-12.
(Continued)

*Primary Examiner* — James M Hannett
(74) *Attorney, Agent, or Firm* — Pillsbury Winthrop Shaw Pittman LLP

(57) ABSTRACT

A fuzzy extractor includes an initial key generating part including a true random number generator, and a key regenerating part. The true random number generator generates a true random number using a read-out signal read from the reading part or a pixel signal read from the pixels of the pixel part in a true random number generation mode. The initial key generating part generates helper data and an initial key based on the true random number generated by the true random number generator and variation information acquired as a response when the initial key is generated. The key regenerating part generates, when a key is regenerated, a unique key based on helper data acquired when the initial key is generated and variation information acquired as a response including an error when the key is regenerated.

15 Claims, 34 Drawing Sheets

(51) Int. Cl.
*H01L 27/146* (2006.01)
*H04L 9/08* (2006.01)
*H04L 9/32* (2006.01)
*H04N 5/369* (2011.01)
*H04N 5/3745* (2011.01)

(52) U.S. Cl.
CPC .......... *H04L 9/0891* (2013.01); *H04L 9/3278* (2013.01); *H04N 5/3696* (2013.01); *H04N 5/37457* (2013.01)

(56) References Cited

U.S. PATENT DOCUMENTS

| | | |
|---|---|---|
| 2017/0104949 A1 | 4/2017 | Kim et al. |
| 2018/0115723 A1 | 4/2018 | Takayanagi et al. |
| 2018/0205901 A1 | 7/2018 | Ocura et al. |
| 2020/0252217 A1* | 8/2020 | Mathieu ................ H04L 9/0866 |

FOREIGN PATENT DOCUMENTS

| | | |
|---|---|---|
| WO | 2018/183572 A1 | 10/2018 |
| WO | 2019/142898 A1 | 7/2019 |

OTHER PUBLICATIONS

Nakura et al., A Proposal of PUF utilizing Pixel Variations in the CMOS Image Sensor(2)—PUF Performance Evaluation with Measured Data -, 2017 Symposium on Cryptography and Information Security, The Institute of Electronics, Information and Communication Engineers, Jan. 24, 2017, pp. 1-9.

Lim et al., Extracting Secret Keys From Integrated Circuits, IEEE Transactions On Very Large Scale Integration (VLSI) Systems, Oct. 2005, pp. 1-6, vol. 13(10).

Suh et al., Physical Unclonable Functions for Device Authentication and Secret Key Generation, Design Automation Conference, Jun. 4, 2007, pp. 1-6, San Diego, California.

Dodis et al., Fuzzy Extractors: How to Generate Strong Keys from Biometrics and Other Noisy Data, Cachin C., Camenisch J.L. (eds) Advances in Cryptology—EUROCRYPT 2004, 2004, Lecture Notes in Computer Science, vol. 3027, Springer, Berlin, Heidelberg.

European Patent Office, Extended European Search Report issued in EP 20160808.0, dated Sep. 6, 2020, pp. 1-14.

Cao et al., "CMOS Image Sensor Based Physical Unclonable Function for Coherent Sensor-Level Authentication", IEEE Transactions on Circuits and Systems—I: Regular Papers, Nov. 2015, pp. 2629-2640, vol. 62(11).

* cited by examiner (Example)

| A | B | XOR |
|---|---|-----|
| 0 (60%) | 0 (60%) | 0 (36%) |
|  | 1 (40%) | 1 (24%) |
| 1 (40%) | 0 (60%) | 1 (24%) |
|  | 1 (40%) | 0 (16%) |

XOR output
(Randomness is improved by 8%)
0: 52% (=36+16)
1: 48% (=24+24)

Conceptual Digaram of ΔVout_get

Correct Code

| -1 | 1 | 1 | -1 | 1 | -1 | -1 | 1 |
|---|---|---|---|---|---|---|---|

$\vec{v}$

| 1 | 1 | 1 | 1 | 1 | 1 | 1 | 1 |
|---|---|---|---|---|---|---|---|
| -1 | 1 | -1 | 1 | -1 | 1 | -1 | 1 |
| -1 | -1 | 1 | 1 | -1 | -1 | 1 | 1 |
| 1 | -1 | -1 | 1 | 1 | -1 | -1 | 1 |
| -1 | -1 | -1 | -1 | 1 | 1 | 1 | 1 |
| 1 | -1 | 1 | -1 | -1 | 1 | -1 | 1 |
| 1 | 1 | -1 | -1 | -1 | -1 | 1 | 1 |
| -1 | 1 | 1 | -1 | 1 | -1 | -1 | 1 |
| -1 | -1 | -1 | -1 | -1 | -1 | -1 | -1 |
| 1 | -1 | 1 | -1 | 1 | -1 | 1 | -1 |
| 1 | 1 | -1 | -1 | 1 | 1 | -1 | -1 |
| -1 | 1 | 1 | -1 | -1 | 1 | 1 | -1 |
| 1 | 1 | 1 | 1 | -1 | -1 | -1 | -1 |
| -1 | 1 | -1 | 1 | 1 | -1 | 1 | -1 |
| -1 | -1 | 1 | 1 | 1 | 1 | -1 | -1 |
| 1 | -1 | -1 | 1 | -1 | 1 | 1 | -1 |

Weights

| 0.98 | 0.90 | 0.20 | 1.00 | 0.90 | 0.10 | 1.00 | 0.30 |
|---|---|---|---|---|---|---|---|

| -0.98 | 0.90 | 0.20 | -1.00 | 0.90 | -0.10 | -1.00 | 0.30 |
|---|---|---|---|---|---|---|---|

Inner Product (Component) — No Noise Inner Product

| -0.98 | 0.9 | 0.2 | -1 | 0.9 | -0.1 | -1 | 0.3 | -0.776 |
|---|---|---|---|---|---|---|---|---|
| 0.976 | 0.9 | -0.2 | -1 | -0.9 | -0.1 | 1 | 0.3 | 0.976 |
| 0.976 | -0.9 | 0.2 | -1 | -0.9 | 0.1 | -1 | 0.3 | -2.224 |
| -0.98 | -0.9 | -0.2 | -1 | 0.9 | 0.1 | 1 | 0.3 | -0.776 |
| 0.976 | -0.9 | -0.2 | 1 | 0.9 | -0.1 | -1 | 0.3 | 0.976 |
| -0.98 | -0.9 | 0.2 | 1 | -0.9 | -0.1 | 1 | 0.3 | -0.376 |
| -0.98 | 0.9 | -0.2 | 1 | -0.9 | 0.1 | -1 | 0.3 | -0.776 |
| 0.98 | 0.9 | 0.2 | 1 | 0.9 | 0.1 | 1 | -0.3 | 5.376 |
| 0.976 | -0.9 | -0.2 | 1 | -0.9 | 0.1 | 1 | -0.3 | 0.776 |
| -0.98 | -0.9 | 0.2 | 1 | 0.9 | 0.1 | -1 | -0.3 | -0.976 |
| -0.98 | 0.9 | -0.2 | 1 | 0.9 | -0.1 | 1 | -0.3 | 2.224 |
| 0.976 | 0.9 | 0.2 | 1 | -0.9 | -0.1 | -1 | -0.3 | 0.776 |
| -0.98 | 0.9 | 0.2 | -1 | -0.9 | 0.1 | 1 | -0.3 | -0.976 |
| 0.976 | -0.9 | -0.2 | -1 | 0.9 | -0.1 | 1 | -0.3 | 0.376 |
| 0.976 | -0.9 | 0.2 | -1 | 0.9 | -0.1 | -1 | -0.3 | 0.776 |
| -0.98 | 0.9 | -0.2 | -1 | -0.9 | -0.1 | -1 | -0.3 | -5.376 |

| -0.98 | 0.90 | 0.20 | -1.00 | 0.90 | -0.10 | -1.00 | 0.30 |
|---|---|---|---|---|---|---|---|

Inner Product (Component) — 1 Noise Bit Inner Product

| -0.98 | 0.9 | 0.2 | -1 | 0.9 | 0.1 | -1 | 0.3 | -0.576 |
|---|---|---|---|---|---|---|---|---|
| 0.976 | 0.9 | -0.2 | -1 | -0.9 | 0.1 | 1 | 0.3 | 1.176 |
| 0.976 | -0.9 | 0.2 | -1 | -0.9 | -0.1 | -1 | 0.3 | -2.424 |
| -0.98 | -0.9 | -0.2 | -1 | 0.9 | -0.1 | 1 | 0.3 | -0.976 |
| 0.976 | -0.9 | -0.2 | 1 | 0.9 | 0.1 | -1 | 0.3 | 1.176 |
| -0.98 | -0.9 | 0.2 | 1 | -0.9 | 0.1 | 1 | 0.3 | -0.176 |
| -0.98 | 0.9 | -0.2 | 1 | -0.9 | -0.1 | -1 | 0.3 | 0.976 |
| 0.98 | 0.9 | 0.2 | 1 | 0.9 | -0.1 | 1 | 0.3 | 5.176 |
| 0.976 | -0.9 | -0.2 | 1 | -0.9 | -0.1 | 1 | -0.3 | 0.576 |
| -0.98 | -0.9 | 0.2 | 1 | 0.9 | -0.1 | -1 | -0.3 | -1.176 |
| -0.98 | 0.9 | -0.2 | 1 | 0.9 | 0.1 | 1 | -0.3 | 2.424 |
| 0.976 | 0.9 | 0.2 | 1 | -0.9 | 0.1 | -1 | -0.3 | 0.976 |
| -0.98 | 0.9 | 0.2 | -1 | -0.9 | -0.1 | 1 | -0.3 | -1.176 |
| 0.976 | 0.9 | -0.2 | -1 | 0.9 | -0.1 | -1 | -0.3 | 0.176 |
| 0.976 | -0.9 | 0.2 | -1 | 0.9 | 0.1 | -1 | -0.3 | 0.976 |
| -0.98 | -0.9 | -0.2 | -1 | -0.9 | 0.1 | -1 | -0.3 | -5.156 |

FIG 33

| -0.98 | 0.90 | 0.20 | -1.00 | 0.90 | 0.10 | -1.00 | 0.30 | |
|---|---|---|---|---|---|---|---|---|
| Inner Product (Component) | | | | | | | | 2 Noise Bits Inner Product |
| -0.98 | 0.9 | -0.2 | -1 | 0.9 | 0.1 | -1 | 0.3 | -0.976 |
| 0.976 | 0.9 | 0.2 | -1 | -0.9 | 0.1 | 1 | 0.3 | 1.576 |
| 0.976 | -0.9 | -0.2 | -1 | -0.9 | -0.1 | -1 | 0.3 | -2.824 |
| -0.98 | -0.9 | 0.2 | -1 | 0.9 | -0.1 | 1 | 0.3 | -0.576 |
| 0.976 | -0.9 | 0.2 | 1 | 0.9 | 0.1 | -1 | 0.3 | 1.576 |
| -0.98 | -0.9 | -0.2 | 1 | -0.9 | 0.1 | 1 | 0.3 | -0.576 |
| -0.98 | 0.9 | 0.2 | 1 | -0.9 | -0.1 | -1 | 0.3 | -0.576 |
| 0.98 | 0.9 | -0.2 | 1 | 0.9 | -0.1 | 1 | -0.3 | 4.776 |
| 0.976 | -0.9 | 0.2 | 1 | -0.9 | -0.1 | 1 | -0.3 | 0.976 |
| -0.98 | -0.9 | -0.2 | 1 | 0.9 | -0.1 | -1 | -0.3 | -1.576 |
| -0.98 | 0.9 | 0.2 | 1 | 0.9 | 0.1 | 1 | -0.3 | 2.824 |
| 0.976 | 0.9 | -0.2 | 1 | -0.9 | 0.1 | -1 | -0.3 | 0.576 |
| -0.98 | 0.9 | -0.2 | -1 | -0.9 | -0.1 | 1 | -0.3 | -1.576 |
| 0.976 | 0.9 | 0.2 | -1 | 0.9 | -0.1 | -1 | -0.3 | 0.576 |
| 0.976 | -0.9 | -0.2 | -1 | 0.9 | 0.1 | 1 | -0.3 | 0.576 |
| -0.98 | -0.9 | 0.2 | -1 | -0.9 | 0.1 | -1 | -0.3 | -4776 |

| -0.98 | 0.90 | -0.20 | -1.00 | 0.90 | 0.10 | -1.00 | -0.30 | |
|---|---|---|---|---|---|---|---|---|
| Inner Product (Component) | | | | | | | | 3 Noise Bits Inner Product |
| -0.98 | 0.9 | -0.2 | -1 | 0.9 | 0.1 | -1 | -0.3 | -1.576 |
| 0.976 | 0.9 | 0.2 | -1 | -0.9 | 0.1 | 1 | -0.3 | 0.976 |
| 0.976 | -0.9 | -0.2 | -1 | -0.9 | -0.1 | -1 | -0.3 | -3.424 |
| -0.98 | -0.9 | 0.2 | -1 | 0.9 | -0.1 | 1 | -0.3 | -1.176 |
| 0.976 | -0.9 | 0.2 | 1 | 0.9 | 0.1 | -1 | -0.3 | 0.976 |
| -0.98 | -0.9 | -0.2 | 1 | -0.9 | 0.1 | 1 | -0.3 | -1.176 |
| -0.98 | 0.9 | 0.2 | 1 | -0.9 | -0.1 | -1 | -0.3 | -1.176 |
| 0.98 | 0.9 | -0.2 | 1 | 0.9 | -0.1 | 1 | -0.3 | 4.176 |
| 0.976 | -0.9 | 0.2 | 1 | -0.9 | -0.1 | 1 | 0.3 | 1.576 |
| -0.98 | -0.9 | -0.2 | 1 | 0.9 | -0.1 | -1 | 0.3 | -0.976 |
| -0.98 | 0.9 | 0.2 | 1 | 0.9 | 0.1 | 1 | 0.3 | 3.424 |
| 0.976 | 0.9 | -0.2 | 1 | -0.9 | 0.1 | -1 | 0.3 | 1.176 |
| -0.98 | 0.9 | -0.2 | -1 | -0.9 | -0.1 | 1 | 0.3 | -0.976 |
| 0.976 | 0.9 | 0.2 | -1 | 0.9 | -0.1 | -1 | 0.3 | 1.176 |
| 0.976 | -0.9 | -0.2 | -1 | 0.9 | 0.1 | 1 | 0.3 | 1.176 |
| -0.98 | -0.9 | 0.2 | -1 | -0.9 | 0.1 | -1 | 0.3 | -4.176 |

FIG 34

SOLID-STATE IMAGING DEVICE, METHOD FOR DRIVING SOLID-STATE IMAGING DEVICE, AND ELECTRONIC APPARATUS

CROSS-REFERENCE TO RELATED APPLICATIONS

This application is based on and claims the benefit of priority from Japanese Patent Application Serial No. 2019-039240 (filed on Mar. 5, 2019), the contents of which are hereby incorporated by reference in their entirety.

TECHNICAL FIELD

The present invention relates to a solid-state imaging device, a method for driving a solid-state imaging device, and an electronic apparatus.

BACKGROUND ART

Solid-state imaging devices (image sensors) including photoelectric conversion elements for detecting light and generating charges are embodied as CMOS (complementary metal oxide semiconductor) image sensors, which have been in practical use. The CMOS image sensors have been widely applied as parts of various types of electronic apparatuses such as digital cameras, video cameras, surveillance cameras, medical endoscopes, personal computers (PCs), mobile phones and other portable terminals (mobile devices).

As mentioned above, the CMOS image sensors are used to optically capture images in a wide range of application fields and thus have a large market. The demand for the CMOS image sensors is expected to keep growing in the future due to the increase in the CMOS image sensor applications including vehicle-mounted cameras.

In recent years, the Internet of Things (IoT), which allows everything of daily use to be connected to the Internet, has been attracting great attention. The IoT has made it possible to acquire data, collect the data in calculators on the cloud side through the Internet, analyze the collected data on the cloud side and return the result of the analysis to the IoT side. For example, when completely automated driving is realized, a vehicle-mounted sensor can be considered to be part of the IoT. If the acquired data is falsified, serious results such as accidents may be caused.

In this IoT age, it is increasingly crucial to improve the security of IoT sensors, which receives information. In order to improve the security of IoT sensors, it is required to first make sure that no illicit sensors are connected and to next verify that the data acquired by the sensors have not been falsified. The conventional encryption technique protects digital signals output from the microcomputer chips but does not always protect immediate signals output from the sensor chips. This is because sensors supplied as parts are required to be inexpensive and the security technology is not commonly used, which requires extra circuits.

Here, the Physically Unclonable Function (PUF) technology has been recently attracting attention as the LSI security technology. The PUF technology extracts variations among semiconductor devices as physical characteristic amounts of the semiconductor devices to acquire an output unique to each device. A PUF used in semiconductor devices is a circuit for extracting minute differences in performance attributable to factors such as variations among threshold values of transistors that occur during the manufacturing process and outputting the extracted differences as a unique ID. The unique ID generated by the PUF can be used to authenticate the device and to prevent falsification of acquired data by appending a message authentication code (MAC) to the acquired data in order to verify its authenticity.

In the above-described context, a CMOS image sensor PUF (CIS-PUF) has been proposed that can accomplish security function by extracting pixel variations of a CMOS image sensor (CIS) and utilizing the extracted variations as unique information of the CIS without addition of extra circuits to the CIS.

For example, Okura, Nakura, Shirahata, Shiozaki, Kubota, Ishikawa, Takayanagi, Fujino, "A Proposal of PUF Utilizing Pixel Variations in the CMOS Image Sensor (1)—Basic Concept and Simulation Study—," 2017 Symposium on Cryptography and Information Security (SCIS2017), 3C4-4, 2017 and Nakura, Okura, Shirahata, Shiozaki, Kubota, Ishikawa, Takayanagi, Fujino, "A Proposal of PUF Utilizing Pixel Variations in the CMOS Image Sensor (2)—PUF Performance Evaluation with Measured Data—" 2017 Symposium on Cryptography and Information Security (SCIS2017), 3C4-5, 2017 disclose a CMOS image sensor PUF (CIS-PUF) that generates a PUF unique ID based on pixel variations of a CMOS image sensor in order to authenticate the sensor and prevent falsification of image data.

When such a CIS-PUF generates a PUF response, a multi-bit, for example, 12-bit digital value (Vout) corresponding to pixel transistor variations is output and the CIS-PUF produces a 1/0 response based on which one of adjacent transistors has a larger threshold voltage value. When there is a large difference between the values Vout of the pixel transistors compared against each other to determine which is larger, the corresponding bit can be judged as stable since a change in environmental conditions such as noise, temperature and voltage does not invert the relation in terms of magnitude between the threshold voltage levels.

In the conventional art, a typical PUF is configured to, while generating a PUF response, determine a bit that is highly likely to be erroneous in a response (see D. Lim, J. W. Lee, B. Gassend, G. E. Suh, M. van Di jk, S. Devadas, "Extracting secret keys from integrated circuits", IEEE Trans. on VLSI System, vol 13, no. 10, pp. 1200-1205, 2005 and G. E. Suh, S. Devadas, "Physical Unclonable Functions for Device Authentication and Secret Key Generation" DAC' 07, pp. 9-14, 2007).

The PUF, which protects security using unique variations among individual devices, can be applied to perform Challenge & Response (CR) authentication and generate encryption keys (unique keys).

The PUF response inevitably contains errors induced by noise. When the PUF is applied to the CR authentication, such errors are considered and a threshold value is set to tolerate inconsistent bits to a certain extent for the authentication. The generation of encryption keys based on the PUF, on the other hand, tolerates no bit errors. Therefore, after an initial key is generated, it is required to eliminate errors in generating (regenerating) the same key.

A fuzzy extractor has been proposed to generate keys and eliminate such errors (see, for example, Y. Dodis, R. Ostrovsky, L. Reyzin, and A. Smith, "Fuzzy Extractors: How to Generate Strong Keys from Biometrics and Other Noizy Data," LNCS 3027, pp. 523-540, 2004.).

The fuzzy extractor can generate an encryption key based on a pseudo random number and a PUF response and eliminate random noise.

The pseudo random number, however, only has limited randomness and may be easily compromised by replay attack. This means that the fuzzy extractor requires a true random number generator, but existing true random number generators disadvantageously increase the cost.

SUMMARY

An object of the present invention is to provide a solid-state imaging device, a method for driving a solid-state imaging device and an electronic apparatus that can generate true random numbers with high randomness at a low cost and resultantly reliably prevent falsification and forgery of images.

A first aspect of the present invention provides a solid-state imaging device including a pixel part having a plurality of pixels arranged in a matrix pattern, where the pixels have a photoelectric converting function, a reading part for reading a pixel signal from the pixel part, and a response data generating part including a fuzzy extractor, where the response data generating part generates response data including a unique key in association with at least one selected from the group consisting of variation information of the pixels and variation information of the reading part. The fuzzy extractor includes an initial key generating part including a true random number generator arranged to correspond to a column output from the pixel part or a pixel signal read from the pixels by the reading part in a true random number generation mode, where the true random number generator generates a true random number using a read-out signal read from a column signal processing part of the reading part, the column signal processing part processes a column output signal input thereto, the initial key generating part generates an initial key and helper data based on the true random number generated by the true random number generator and the variation information acquired as a response when the initial key is generated, and a key regenerating part for generating, when a key is regenerated, a unique key based on the helper data acquired by generating the initial key and variation information acquired as a response including an error when the key is regenerated.

A second aspect of the present invention provides a method for driving a solid-state imaging device including a pixel part having a plurality of pixels arranged in a matrix pattern, where the pixels have a photoelectric converting function, and a reading part for reading a pixel signal from the pixel part. The method includes steps of acquiring at least one selected from the group consisting of variation information of the pixels and variation information of the reading part and generating response data including a unique key in association with the variation information acquired in the acquiring step, where the response data generating step includes fuzzy extraction performed using a fuzzy extractor. The fuzzy extraction included in the response data generating step includes steps of generating an initial key and helper data, where the initial key generating step includes a step of generating a true random number using a read-out signal read from a column signal processing part of the reading part, where the column signal processing part processes a column output signal input thereto, by a true random number generator arranged to correspond to a column output from the pixel part or a pixel signal read from the pixels by the reading part in a true random number generation mode, where the initial key and the helper data are generated based on the true random number generated in the true random number generating step and the variation information acquired as a response when the initial key is generated, and when a key is regenerated, generating a unique key based on the helper data acquired by generating the initial key and variation information acquired as a response including an error when the key is regenerated.

A third aspect of the present invention provides an electronic apparatus including a solid-state imaging device and an optical system for forming a subject image on the solid-state imaging device. The solid-state imaging device includes a pixel part having a plurality of pixels arranged in a matrix pattern, where the pixels have a photoelectric converting function, a reading part for reading a pixel signal from the pixel part, and a response data generating part including a fuzzy extractor, where the response data generating part generates response data including a unique key in association with at least one selected from the group consisting of variation information of the pixels and variation information of the reading part. The fuzzy extractor includes an initial key generating part including a true random number generator arranged to correspond to a column output from the pixel part or a pixel signal read from the pixels by the reading part in a true random number generation mode, where the true random number generator generates a true random number using a read-out signal read from a column signal processing part of the reading part, where the column signal processing part processes a column output signal input thereto, where the initial key generating part generates an initial key and helper data based on the true random number generated by the true random number generator and the variation information acquired as a response when the initial key is generated and a key regenerating part for generating, when a key is regenerated, a unique key based on the helper data acquired by generating the initial key and variation information acquired as a response including an error when the key is regenerated.

Advantageous Effects

The present invention can generate true random numbers with high randomness at a low cost and resultantly reliably prevent falsification and forgery of images.

BRIEF DESCRIPTION OF THE DRAWINGS

FIG. 31 shows RM codes that are assigned to all of the four bits.

FIG. 32 shows humming distance (HD) between the code of a regenerated response containing noise and the other codes.

FIG. 33 shows a small weight is assigned to a bit that is likely to be inverted, and a large weight is given to a bit that is unlikely to be inverted.

FIG. 34 shows that the negative contribution is small relative to the positive contribution made by the not-inverted bits.

DESCRIPTION OF THE EMBODIMENTS

Embodiments of the present invention will be hereinafter described with reference to the drawings.

First Embodiment

Figure 1:
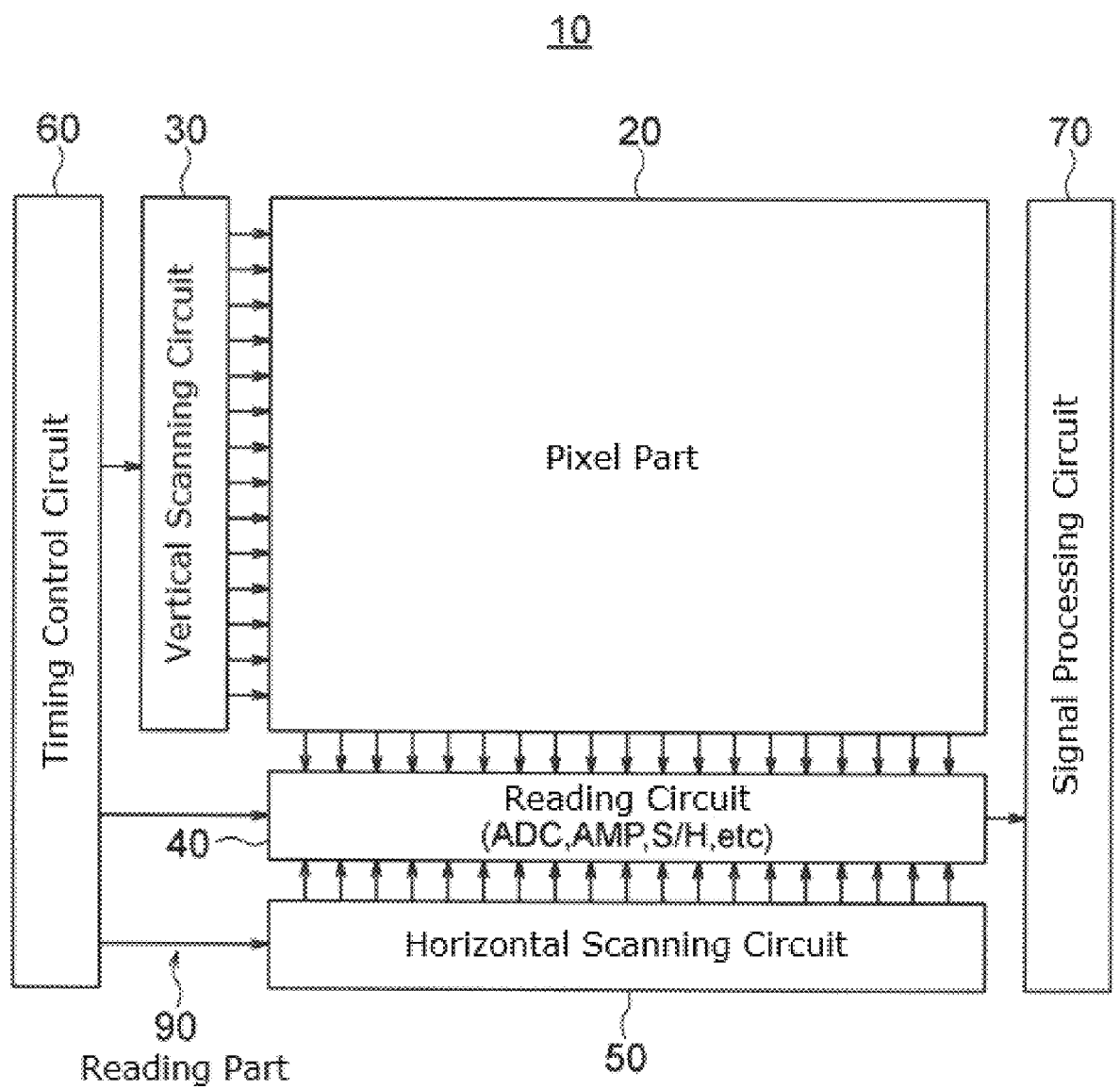
FIG. 1 is a block diagram showing an example configuration of a solid-state imaging device according to a first embodiment of the present invention.

FIG. 1 is a block diagram showing an example configuration of a solid-state imaging device according to a first embodiment of the present invention. In this embodiment, a solid-state imaging device 10 is constituted by, for example, a CMOS image sensor.

As shown in FIG. 1, the solid-state imaging device 10 is constituted mainly by a pixel part 20 serving as an image capturing part, a vertical scanning circuit (a row scanning circuit) 30, a reading circuit (a column reading circuit) 40, a horizontal scanning circuit (a column scanning circuit) 50, a timing control circuit 60, and a signal processing circuit 70. Among these components, for example, the vertical scanning circuit 30, the reading circuit 40, the horizontal scanning circuit 50, and the timing control circuit 60 constitute the reading part 90 for reading out pixel signals.

The solid-state imaging device 10 relating to the embodiment is configured as a CMOS image sensor PUF (CIS-PUF) that generates a PUF unique ID based on pixel variations of the CMOS image sensor in order to authenticate the sensor and prevent falsification of image data. The solid-state imaging device 10 or CIS-PUF is configured to, when generating a PUF response, generate response data including a unique key in association with at least one selected from the group consisting of pixel variation information and reading-part variation information.

As mentioned above, the CIS-PUF relating to the embodiment extracts at least one selected from the group consisting of pixel variation information and reading-part variation information of the CMOS image sensor and uses the extracted information to a PUF. The pixel variations are supposed to be largely eliminated by a CDS circuit. The CIS-PUF relating to the present embodiment operates in a normal imaging mode (normal operational mode), in which image capturing is performed with a CDS circuit in operation, and a security mode (PUF mode or response generation mode (MDR)), in which image capturing is performed without placing a CDS circuit in operation. Furthermore, the solid-state imaging device 10 relating to the present embodiment operates in a true random number generation mode MTRG, in which a true random number is generated based on a read-out signal (information) indicative of a FD reset noise of a pixel.

In the solid-state imaging device 10 relating to the present embodiment, a response data generating part uses a fuzzy extractor and generates a stable response by making an effective use of a multi-bit or, for example, 12-bit digital value Vout corresponding to pixel transistor variations.

The fuzzy extractor relating to the first embodiment basically includes an initial key generating part and a key regenerating part. The initial key generating part includes a true random number generator arranged to correspond to the column output from the pixel part 20 or the pixel signal read from the pixel by the reading part 90 in the true random number generation mode. The true random number generator is capable of generating a highly random true random number at a low cost using a read-out signal read from a column signal processing part of the reading part for processing a column output signal input thereto. The initial key generating part is configured to generate helper data and an initial key based on the true random number generated by the true random number generator and variation information acquired as a response when an initial key is generated. The key regenerating part is configured to, when a key is regenerated, generate a unique key based on helper data acquired when an initial key is generated and variation information acquired as a response including an error when a key is regenerated.

The CIS-PUF is a PUF that uses the address of a pixel as a challenge and the 1/0 data generated in a predetermined procedure as a response. The following briefly describes Challenge & Response authentication (CR authentication) using a PUF, which protects security based on unique variations among individual devices.

Figure 2:
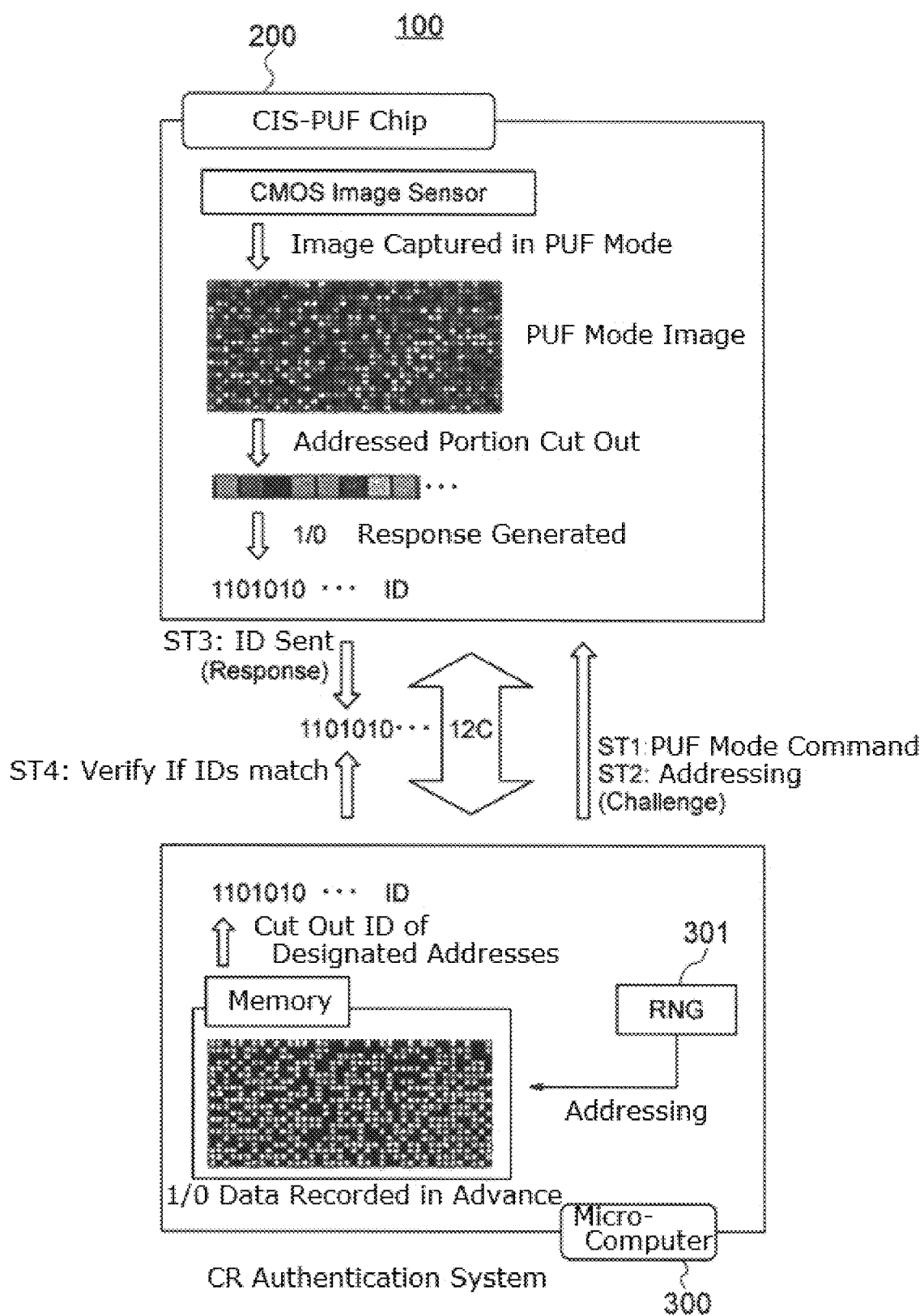
FIG. 2 is used to briefly illustrate a Challenge & Response (CR) authentication system.

FIG. 2 is used to briefly illustrate a Challenge & Response (CR) authentication system.

A CR authentication system 100 shown in FIG. 2 includes a CIS-PUF chip 200 having the solid-state imaging device 10 relating to the embodiment mounted therein and a microcomputer 300.

In the CR authentication system 100 using the CIS-PUF, the microcomputer 300, which is the authenticator side, sends a PUF mode command to the CIS-PUF chip 200 (step ST1). In response to this, the CIS-PUF chip 200 captures an image in a PUF mode and thus acquires a PUF mode image. Following this, the microcomputer 300 uses a random number generator (RNG) 301 in order to provide a random number to determine which pixels are used to generate an ID and sends the designated addresses of the pixels as challenge information to the CIS-PUF chip 200 (step ST2). In accordance with the received designated addresses, the CIS-PUF chip 200 cuts out a PUF mode image and generates 1/0 data. As a response to the challenge, the CIS-PUF chip 200 sends this ID to the microcomputer 300 (step ST3). The microcomputer 300 extracts the ID of the designated addresses from the 1/0 data registered in advance and compares the extracted ID with the ID received from the CIS-PUF chip 200. If the IDs match, the authentication is successful (step ST4).

The following outlines the configurations and functions of the parts of the solid-state imaging device 10, in particular, the configuration and function of the pixel part 20. The following then describes the characteristic configurations and functions of the solid-state imaging device 10 relating to the present embodiment, with a focus on unique key generation and response data generation for integrating identification data including the unique key with image data to generate response data, which is also referred to as encryption. More specifically, in order to generate stable response data, the response data generating part uses a fuzzy extractor including a true random number generator. In order to generate a stable response, the response data generating part makes an effective use of a 12-bit digital value Vout, which is equivalent to pixel transistor variations. The following also describes in detail a second embodiment, which is a method of acquiring reliability information of PUF response bits and uses the acquired reliability information in a soft decision fuzzy extractor (key regenerating part). The following also shows the results of using actual data to examine the correcting capability achieved by the soft decision made by the fuzzy extractor.

<Basic Configurations of Pixel and Pixel Part 20>

In the pixel part 20, a plurality of pixels each including a photodiode (photoelectric converting element) and an in-pixel amplifier are arranged in a two-dimensional matrix comprised of n rows and m columns.

Figure 3:
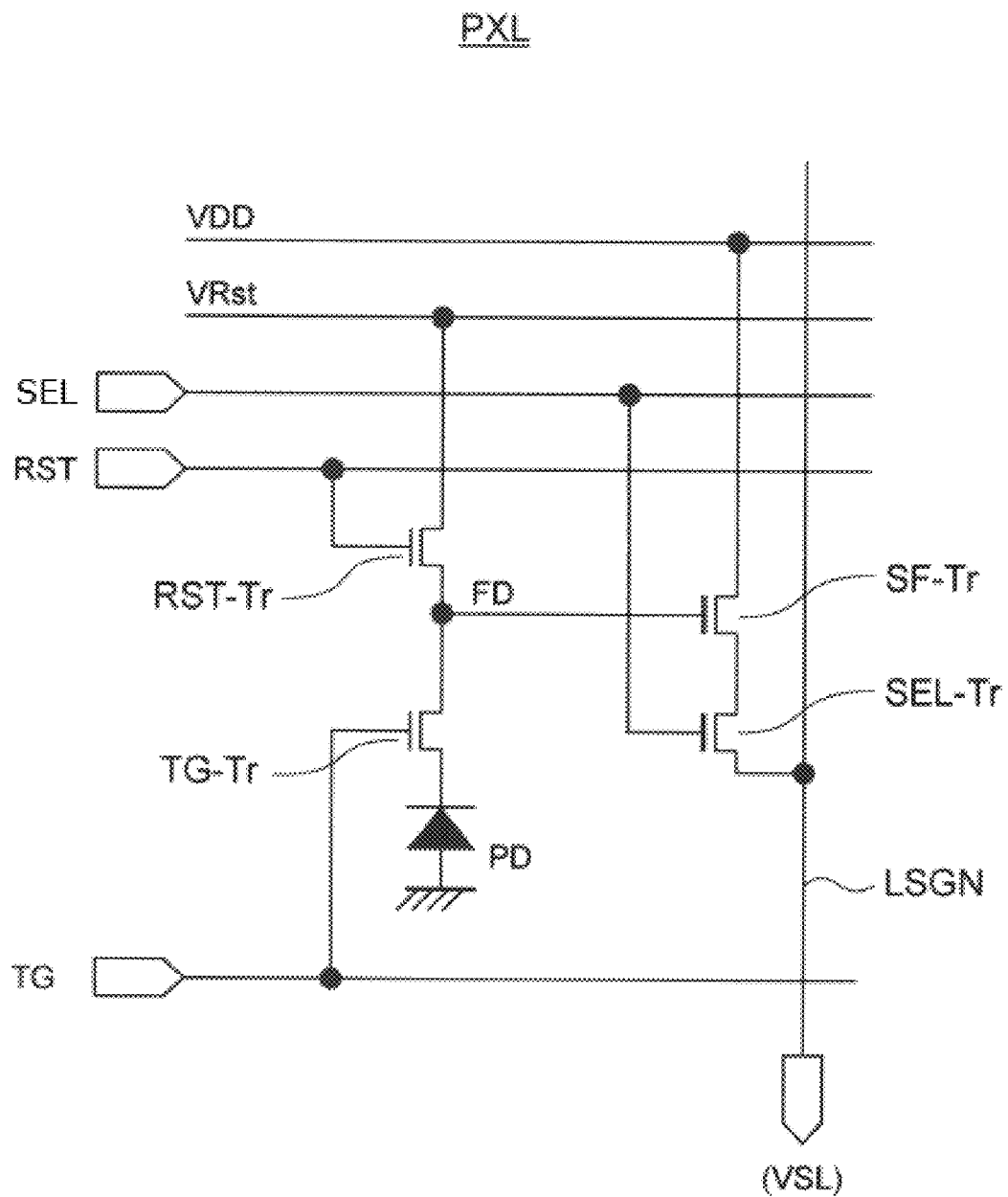
FIG. 3 is a circuit diagram showing an example of a pixel relating to the embodiment of the present invention.

FIG. 3 is a circuit diagram showing an example of the pixel relating to the present embodiment.

The pixel PXL includes, for example, a photodiode (PD) serving as a photoelectric converting element. For the photodiode PD, one transfer transistor TG-Tr, one reset transistor RST-Tr, one source follower transistor SF-Tr and one selection transistor SEL-Tr are provided.

The photodiode PD generates signal charges (electrons) in an amount in accordance with the quantity of the incident light and stores the generated signal charges. A description will be hereinafter given of a case where the signal charges are electrons and each transistor is an n-type transistor. However, it is also possible that the signal charges are holes or each transistor is a p-type transistor. Further, this embodiment is also applicable to the case where a plurality of photodiodes share the transistors, namely, the reset transistor RST-Tr, source follower transistor SF-Tr and selection transistor SEL-Tr, and to the case where the pixel includes three transistors (3Tr) and excludes the selection transistor, as will be illustrated below.

The transfer transistor TG Tr is connected between the photodiode (PD) and a floating diffusion (FD) and controlled through a control signal TG. The transfer transistor TG-Tr remains selected and in the conduction state during a period in which the control signal TG is at the high (H) level, to transfer to the floating diffusion FD the electrons produced by photoelectric conversion in the photodiode PD.

The reset transistor RST-Tr is connected between a power supply line VRst and the floating diffusion FD and controlled through a control signal RST. The reset transistor RST-Tr may be alternatively connected between the power supply line VDD and the floating diffusion FD and controlled through the control signal RST. The reset transistor RST-Tr remains selected and in the conduction state during a period in which the control signal RST is at the H level, to reset the floating diffusion FD to the potential of the power supply line VRst (or VDD).

The source follower transistor SF-Tr and the selection transistor SEL-Tr are connected in series between the power supply line VDD and the vertical signal line LSGN. The gate of the source follower transistor SF-Tr is connected to the floating diffusion FD, and the selection transistor SEL-Tr is controlled through a control signal SEL. The selection transistor SEL-Tr remains selected and in the conduction state during a period in which the control signal SEL is at the H level. In this way, the source follower transistor SF-Tr outputs, to the vertical signal line LSGN, a column output analog signal VSL corresponding to the potential at the floating diffusion FD. These operations are performed simultaneously and in parallel for pixels in each row since, for example, the gates of the transfer transistors TG-Tr, the reset transistors RST-Tr, and the selection transistors SEL-Tr in each row are connected to each other.

Since the pixel part 20 includes the pixels PXL arranged in n rows and m columns, there are n control lines for each of the control signals SEL, RST and TG, and m vertical signal lines LSGN. In FIG. 3, the control line of each control signal SEL, RST, TG is represented as one row-scanning control line.

The vertical scanning circuit 30 drives the pixels in shutter and read-out rows through the row-scanning control lines under the control of the timing control circuit 60. Further, the vertical scanning circuit 30 outputs, according to address signals, row selection signals for row addresses of the read-out rows from which signals are to be read out and the shutter rows in which the charges accumulated in the photodiodes PD are reset.

The reading circuit 40 includes a plurality of column signal processing circuits (not shown) arranged corresponding to the column outputs of the pixel part 20, and the reading circuit 40 may be configured such that the plurality of column signal processing circuits can perform column parallel processing.

The reading circuit 40 may include a correlated double sampling (CDS) circuit, an analog-to-digital converter (ADC), an amplifier (AMP), a sample/hold (S/H) circuit, and the like.

Figure 4A:
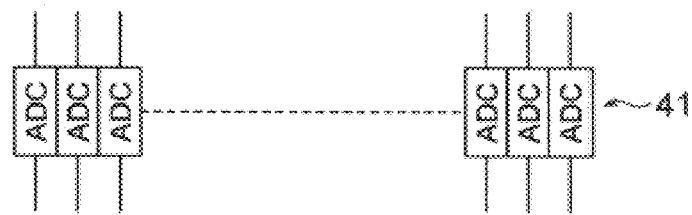
FIGS. 4A to 4C illustrate example configurations of a reading system for column outputs from a pixel part of the solid-state imaging device according to the embodiment of the present invention.
Figure 4B:
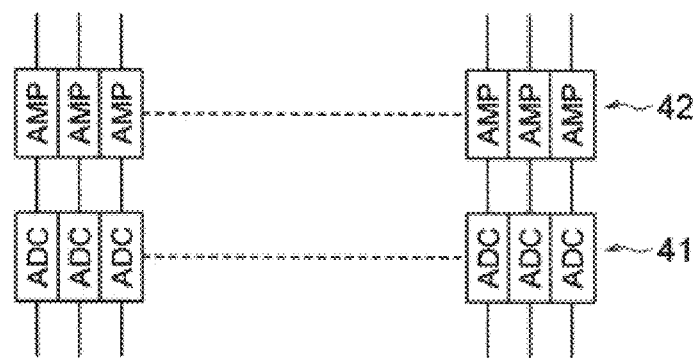
Figure 4C:
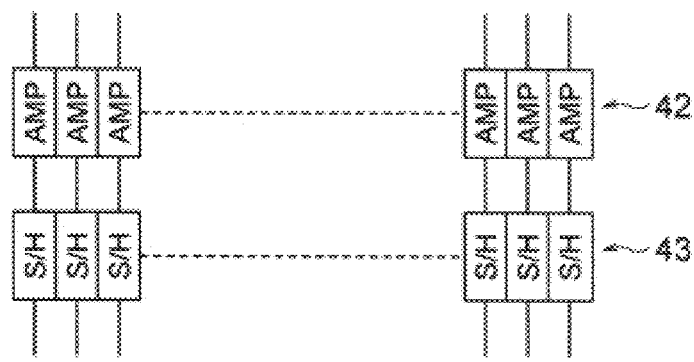

As mentioned above, as shown in FIG. 4A, for example, the reading circuit 40 may include ADCs 41 for converting the column output analog signals VSL from the pixel part 20 into digital signals. Alternatively, as shown in FIG. 4B, for example, the reading circuit 40 may include amplifiers (AMPs) 42 for amplifying the column output analog signals VSL from the pixel part 20. It is also possible that, as shown in FIG. 4C, for example, the reading circuit 40 may include sample/hold (S/H) circuits 43 for sampling/holding the column output analog signals VSL from the pixel part 20. The reading circuit 40 may have an SRAM arranged therein, which serves as a column memory for saving therein a signal acquired by performing a predetermined processing on the pixel signal output from each column of the pixel part 20.

The horizontal scanning circuit 50 scans the signals processed in the plurality of column signal processing circuits of the reading circuit 40 such as ADCs, transfers the signals in a horizontal direction, and outputs the signals to the signal processing circuit 70.

The timing control circuit 60 generates timing signals required for signal processing in the pixel part 20, the vertical scanning circuit 30, the reading circuit 40, the horizontal scanning circuit 50, and the like.

The signal processing circuit 70 performs predetermined signal processing on the read-out signals that have been read by the reading circuit 40 and subjected to predetermined processing to generate two-dimensional image data, in a normal reading mode (MDU).

As described above, the solid-state imaging device (CMOS image sensor) generates electrons from a slight amount of light through photoelectric conversion, converts the electrons into voltage with a minute capacitor, and outputs the voltage using the source follower transistor SF-Tr having a minute area. Therefore, minute noise such as the noise generated when the capacitor is reset and variations among the individual transistors need to be eliminated. To do so, the difference between the reset level (VRST) and the luminance level (signal level: VSIG) is output for each pixel. As mentioned above, the CMOS image sensor outputs the difference between the reset level and the luminance level for each pixel in order to eliminate the reset noise and the variation among the threshold values. In this way, the CMOS image sensor can detect a signal of several electrons.

The detection of the difference is referred to as the correlated double sampling (CDS), which is the widely used technology. The CDS reading is sequentially performed on all of the pixels arranged in an array manner, so that normal two-dimensional image data corresponding to one frame is output.

The solid-state imaging device 10 relating to the present embodiment is configured to perform the series of operations to generate the normal two-dimensional image data when in the normal operational mode (MDU).

The signal processing circuit 70 relating to the present embodiment is configured to, in order to prevent unauthorized usage, falsification and forgery of images, generate a unique key based on variation information (pixel or reading-circuit variations) unique to the solid-state imaging device 10, combine the unique key with the data acquired by the solid-state imaging device 10 to generate identification data, and integrate the identification data with the image data to output the result as response data (RSD). In this way, the identification data cannot be correctly generated when the information relating to the unique key is absent.

The solid-state imaging device 10 relating to the present embodiment is configured to perform the series of operations to generate the unique key in the response generation mode MDR (PUF mode).

In the response generation mode MDR relating to the present embodiment, the solid-state imaging device 10 outputs, as a unique ID, pixel variation pattern (variation information) unique to each chip, which is independent from the surrounding luminance. In other words, in the response generation mode MDR relating to the present embodiment, the solid-state imaging device 10 outputs only the pixel-wise variation pattern. Since the luminance level is not output, the output pattern image can be independent from the conditions under which the image sensor is exposed to light. The output from each pixel contains FPN and thermal noise that randomly varies among individual frames, but the FPN is 10 times or more as large as the thermal noise in the response generation mode MDR. Accordingly, the solid-state imaging device 10 can output as the response data RPD a stable fixed variation pattern.

In the response generation mode MDR relating to the present embodiment, when generating a unique key, the solid-state imaging device 10 generates response data including a unique key in association with at least one selected from the group consisting of pixel variation information and reading-part variation information.

The above has outlined the configurations and functions of the parts of the solid-state imaging device 10, in particular, the basic configuration and function of the pixel part 20. The following describes the characteristic configurations and functions of the solid-state imaging device 10 relating to the present embodiment, with a focus on unique key generation and response data generation for integrating identification data including the unique key with image data to generate response data, which is also referred to as encryption.

Figure 5:
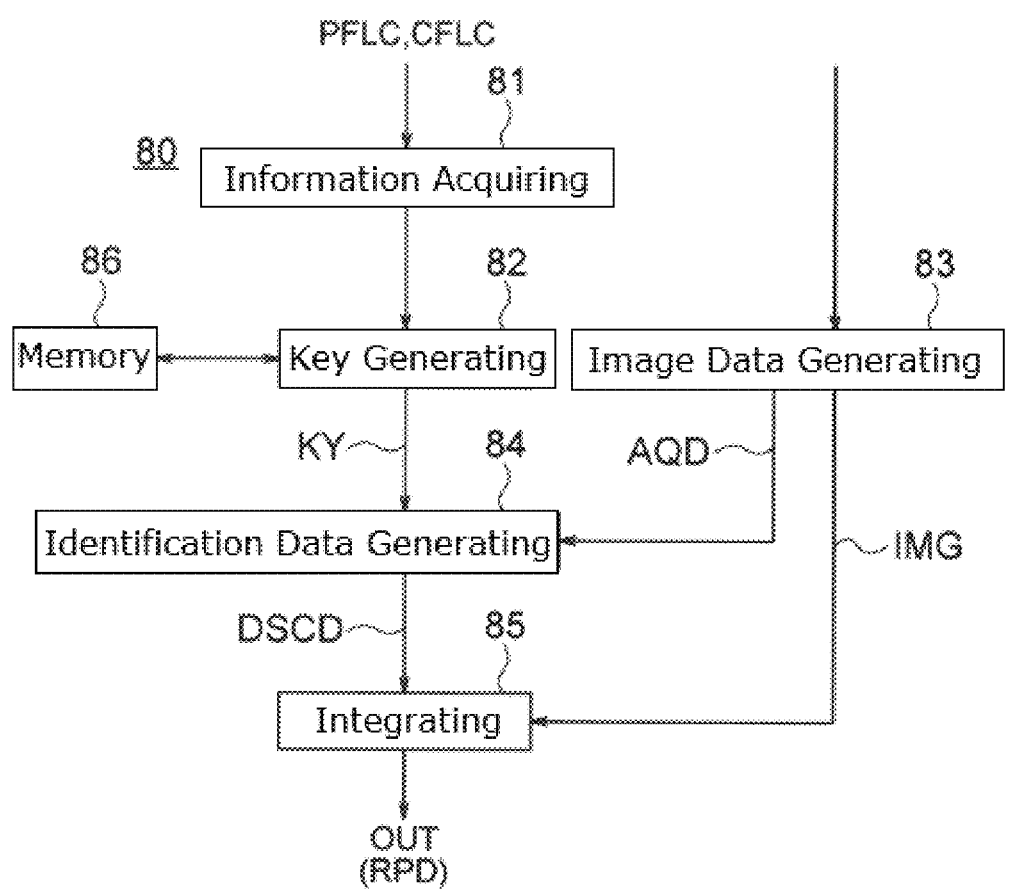
FIG. 5 is a block diagram generally and briefly showing a response generating part, which is an encryption processing system relating to the embodiment of the present invention.
Figure 6:
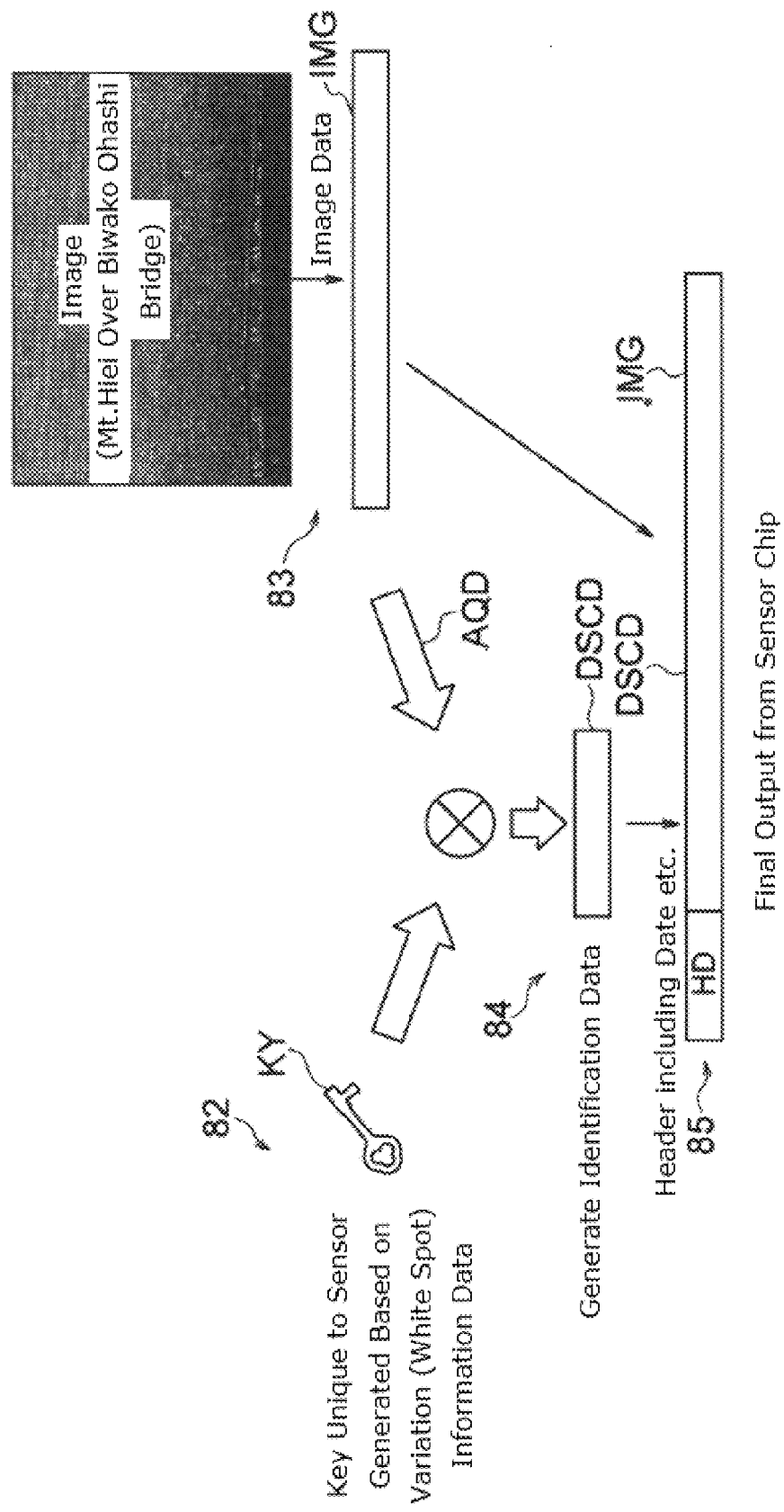
FIG. 6 schematically shows how to generate response data in the encryption processing system shown in FIG. 5.

FIG. 5 is a block diagram generally and briefly showing the response data generating part, which is an encryption processing system relating to the embodiment of the present invention. FIG. 6 schematically shows how the response data generating part, or the encryption processing system shown in FIG. 5, operates.

A response data generating part 80 or the encryption processing system shown in FIG. 5 is mainly constituted by an information acquiring part 81, a key generating part 82, an image data generating part 83, an identification data generating part 84, an integrating part 85, and a memory 86. In the example shown in FIG. 5, the information acquiring part 81 and the key generating part 82 are shown as separate functional blocks, but they may be configured as a single functional block.

The information acquiring part 81 acquires at least one selected from the group consisting of variation information PFLC of the pixels PXL and variation information CFLC of the component circuits of the reading circuit 40 and feeds the acquired variation information to the key generating part 82.

<Configuration of Key Generating Part 82)

The key generating part 82 uses as key generation data KYGD, at least one selected from the group consisting of the pixel variation information and the reading circuit 40 variation information acquired by and fed from the information acquiring part 81 to generate a unique key. The key generating part 82 feeds the generated unique key KY to the identification data generating part 84. The key generating part 82 generates the unique key KY, for example, in a period other than the period in which the effective pixels of the pixel part 20 are read (for example, in a blank period).

In order to enhance the key reproducibility, the key generating part 82 uses a fuzzy extractor for the generation of the key. The fuzzy extractor is an arithmetic logic unit designed to provide the same output in response to a rather stable input.

Figure 7:
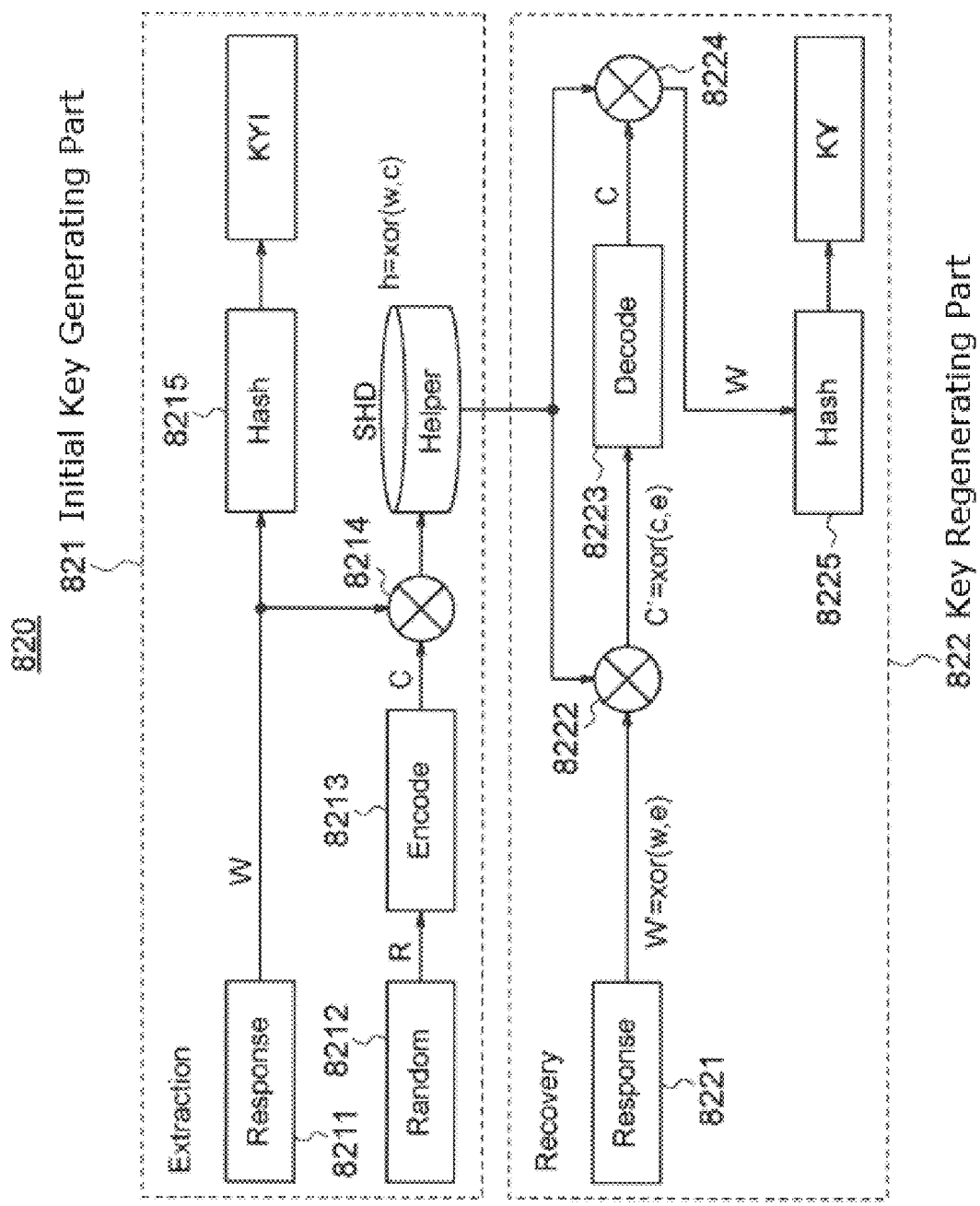
FIG. 7 shows an example configuration of a fuzzy extractor applicable to a unique key output part of a key generating part relating to the first embodiment of the present invention.

FIG. 7 shows an example configuration of a fuzzy extractor applicable to a unique key output part of the key generating part relating to the embodiment of the present invention. A fuzzy extractor 820 shown in FIG. 7 includes an initial key generating part 821 and a key regenerating part 822.

The fuzzy extractor 820 relating to the first embodiment basically includes an initial key generating part 821 and a key regenerating part 822. The initial key generating part 821 includes a true random number generator. The true random number generator is arranged to correspond to the column output from the pixel part 20 or the pixel signal read from the pixel by the reading part 90 in the true random number generation mode MTRG and capable of generating a highly random true random number at a low cost using a read-out signal read from a column signal processing part of the reading part for processing a column output signal input thereto. The initial key generating part 821 is configured to generate helper data and an initial key based on the true random number generated by the true random number generator and variation information that is acquired as a response when the initial key is generated. The key regenerating part 822 is configured to, when a key is regenerated, generate a unique key based on helper data acquired when the initial key is generated and variation information that is acquired as a response including an error when the key is regenerated.

The initial key generating part 821 includes a PUF response input part (Response) 8211, a true random number generator (Random) 8212, an encoding part (Encode) 8213, an exclusive logical or circuit (XOR) 8214, and a first hash part (Hash) 8215.

In the initial key generating part 821, the PUF response input part 8211 extracts the variation information acquired by the information acquiring part 81, for example, the variation information of the threshold value VTH of the source follower transistor SF and uses the extracted information as the input data W. The input data W is input into the XOR 8214 and the first hash part 8215. The first hash part 8215 generates an initial key KYI based on the input data W. The initial key KYI is fed to the identification data generating part 84. The initial key KYI is written into the memory 86 as key data at the time of shipping, for example. For example, the initial key data may be written into a memory such as an electronic fuse (efuse) at the time of shipping of the chip, which can be controlled by software to blow. In this way, the reproducibility of the key data can be reliably protected.

In the initial key generating part 821, the true random number generator 8212 is arranged to correspond to the pixel signal read from the pixel by the reading part 90 in a first random number generation mode MTRG1 or to the column output of the pixel part 20 during a second true random number generation mode MTRG2. The true random number generator 8212 generates a highly random true random number R at a low cost using a read-out signal read from the column signal processing part of the reading part, which is configured to process a column output signal input thereto.

Figure 8:
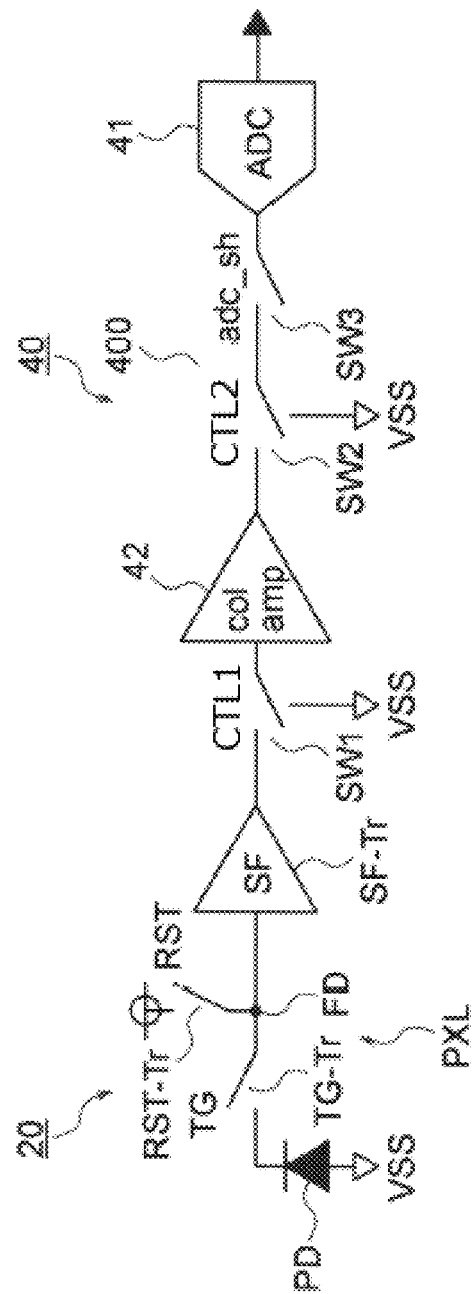
FIG. 8 is used to illustrate a pixel signal read out from a pixel and a read-out signal read out from a column signal processing part of a reading part, which are used when a true random number generator relating to the embodiment generates a true random number.

FIG. 8 is used to illustrate a pixel signal read out from a pixel and a read-out signal read out from the column signal processing part 400 of the reading part 90, which are respectively used by the true random number generator 8212 relating to the present embodiment to generate a true random number R in the first true random number generation mode MTRG1 and the second true random number generation mode MTRG2.

To generate a true random number, the pixel signal read from the pixel can be used. Alternatively, the read-out signal from the column signal processing part 400 of the column reading circuit of the reading part 90 while the read-out signal from the pixel is not input into the column signal processing part 400 can be used.

<Random Number Generation in First True Random Number Generation Mode MTRG1>

Figure 9:
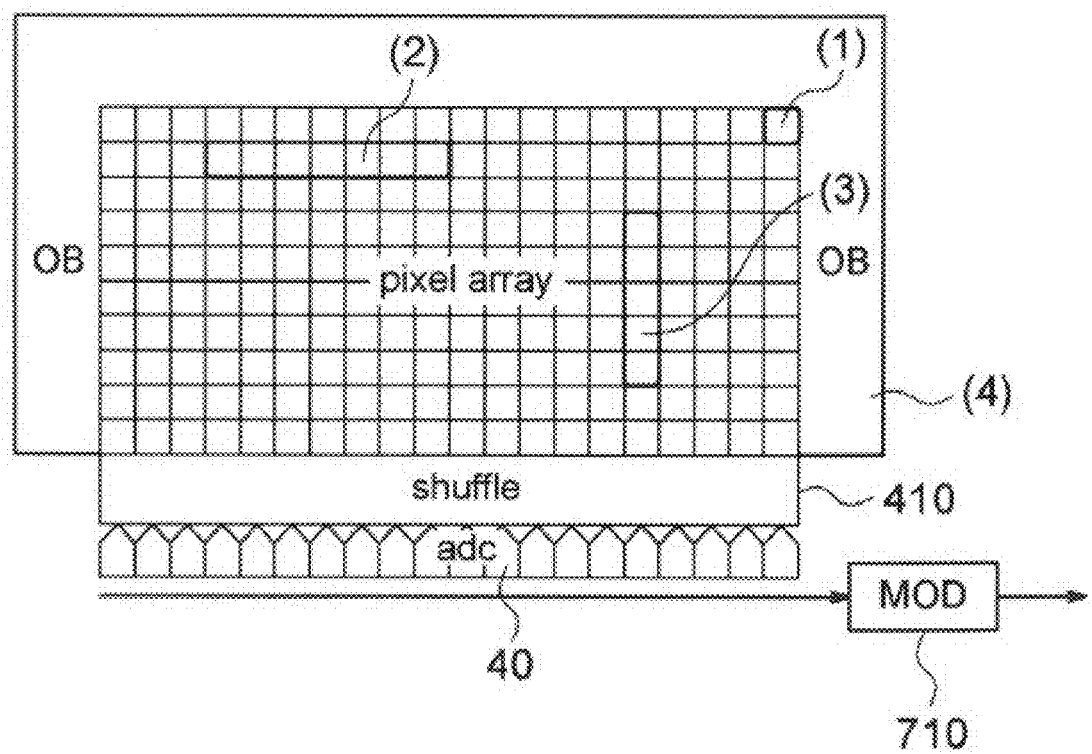
FIG. 9 is used to illustrate, for example, how to read a pixel signal from a pixel when the pixel signal is used to generate a true random number.
Figures 10A, 10B, 10C:
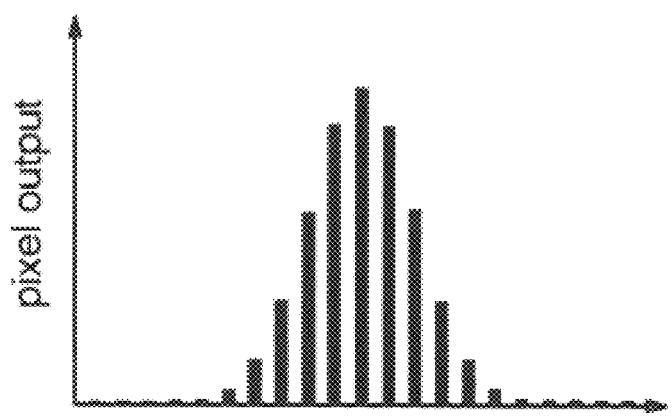
FIGS. 10A to 10C show a pixel output distribution acquired when pixel signals are read out and example outputs from a modulo operator.

FIG. 9 is used to illustrate, for example, how to read a pixel signal from a pixel when the pixel signal is used to generate a true random number. FIGS. 10A to 10C include a pixel output distribution acquired when pixel signals are read out and example outputs from a modulo operator.

The pixel signal pixel_output read out from the pixel PXL by the reading part 90 in the true random number generation mode MTRG1 includes a signal containing FD reset noise observed while the reset transistor RST-Tr is in the conduction state or a signal containing FD reset noise observed while the reset transistor RST-Tr and the transfer transistor TG Tr are in the conduction state. In a predetermined period, the control signal RST can be set at the high (HIGH) level, the control signal TG can be toggled at the beginning in the 1H period and set at the low (LOW) level.

The so-called kTC noise is read from the floating diffusion FD of the pixel PXL, and the floating diffusion FD of the pixel PXL is eliminated in the image signal reading mode. Since the floating diffusion FD has a very small capacitance, large random noise is read out and a light signal is thus removed. A true random number is generated based on a pixel at a very low cost by changing the pixel control sequence. The randomness can be enhanced by simple signal processing.

In the true random number generation mode MTRG1, the control signals CTL1, CTL2 are set at, for example, the High level, so that the switches SW1, SW2 remain in the conduction state in the reading system model shown in FIG. 8. This means that the output of the source follower transistor SF-Tr is input into the amplifier 42 via the switch SW1 and the output of the amplifier 42 is input into the ADC 41 via the switches SW2, SW3.

The following description is made with an example case where a random number has 128 bits. For example, the 12-bit read-out signal from the pixel is binarized via modulo (MOD) operation at a modulo operation unit 710. The partition number N is 2, 4, 8, . . . .

<Case of N=2>

As indicated by the number (1) in FIG. 9, the selected pixel can be read 128 times. The FPN is eliminated and the randomness is thus optimized.

Alternatively, as indicated by the number (2) in FIG. 9, 128 pixels can be selected from a row of pixels. The reading speed is optimized for the CIS including the column reading circuit 40.

Alternatively, as indicated by the number (3) in FIG. 9, 128 pixels can be selected from a column of pixels. The addresses of the selected pixels can be given by a digital pseudo random number generator.

As indicated by the number (4) in FIG. 9, the address of the selected pixel can be the address of the optical black (OB) pixel in order to avoid optical overflow when illumination has high intensity.

The reading part 90 may be configured as shown in FIG. 9 in order to reliably achieve high randomness. To be more specific, the reading part 90 includes a plurality of column signal processing parts 400 (for example, each including an amplifier 42 and an ADC 41) and a multiplexer 410. The column signal processing parts 400 are each arranged to correspond to at least one of the column outputs from the pixel part 20 and configured to process the column output signal input thereinto. The multiplexer 410 is configured to shuffle the destinations of the column output signals from the pixel part 20 so that a given column output signal is input into a column signal processing part different from the intended column signal processing part arranged to correspond to the given column output signal.

Figures 11, 12:
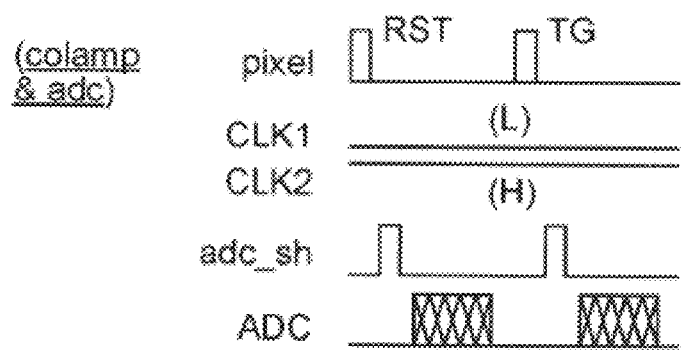
FIG. 11 shows an example of how to improve randomness by performing an XOR (exclusive logical or) operation on output pixel signals from two pixels.
FIG. 12 is used to illustrate, for example, how to read a read-out signal from an ADC and an amplifier of a column signal processing part of a reading part in order to generate a true random number.

The randomness can be enhanced by performing an XOR (exclusive logical or) operation on output pixel signals from two pixels. FIG. 11 shows an example of how randomness is improved by performing an XOR (exclusive logical or) operation on output pixel signals from two pixels. As shown in FIG. 11, a case is assumed where the frequency of 0 (60%) is higher than the frequency of 1 (40%). In this case, the frequency and randomness of 0 and 1 can be enhanced for the XOR outputs. If an XOR operation is performed in a case where "A" is 0 (60%) and "B" is 0 (60%) and 1 (40%), the result is 0 (36%), 1 (24%). If an XOR operation is performed in a case where "A" is 1 (40%) and "B" is 0 (60%) and 1 (40%), the result is 0 (24%), 1 (36%). Accordingly, the XOR output is 0 (52%=36%+12%), 1 (48%=24%+24%). In the example shown in FIG. 11, the randomness is improved by 8%.

It is also possible to perform an XOR operation on two MOD outputs.

<Random Number Generation in Second True Random Number Generation Mode MTRG2>

Figure 13:
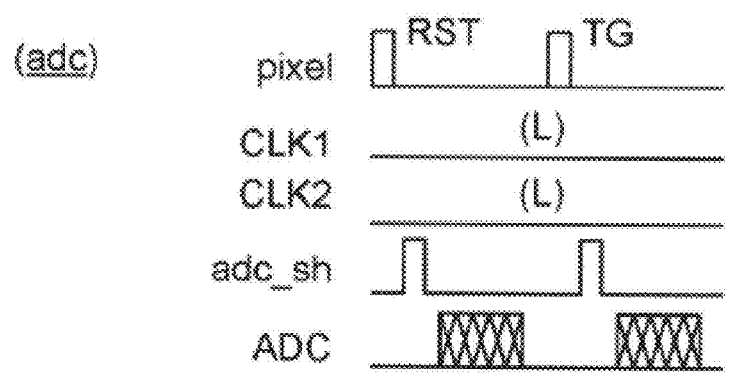
FIG. 13 is used to illustrate, for example, how to read a read-out signal only from an ADC of a column signal processing part of a reading part in order to generate a true random number.

FIG. 12 is used to illustrate, for example, how to read a read-out signal from the amplifier 42 and the ADC 41 of the column signal processing part 400 of the reading part 90 in order to generate a true random number. FIG. 13 is used to illustrate, for example, how to read a read-out signal read only from the ADC 41 of the column signal processing part 400 of the reading part 90 in order to generate a true random number.

In order to generate a true random number, the read-out signal read out from the amplifier 42 and the ADC 41 of the column signal processing part 400 of the reading part 90 can be used, as shown in FIG. 12.

In this case, in the reading system model shown in FIG. 8, the control signal CTL1 is set at the Low level and the control signal CTL2 is set at the High level, for example, so that the switch SW1 remains in the non-conduction state and the switch SW2 remains in the conduction state. This means that the output of the source follower transistor SF-Tr is not input into the amplifier 42 via the switch SW1 and the output of the amplifier 42 is input into the ADC 41 via the switches SW2, SW3.

Alternatively, in order to generate a true random number, the read-out signal read out only from the ADC 41 of the column signal processing part 400 of the reading part 90 can be used, as shown in FIG. 13.

In this case, in the reading system model shown in FIG. 8, the control signals CTL1, CTL2 are set at the Low level, for example, so that the switches SW1, SW2 remain in the non-conduction state. This means that the output of the source follower transistor SF-Tr is not input into the amplifier 42 via the switch SW1 and the output of the amplifier 42 is not input into the ADC 41 via the switches SW2, SW3.

As described above, when a random number is generated in the second true random number generation mode MTRG2, the read-out signal read out from the column signal processing part 400 of the reading part 90 includes (i) the output signal from the ADC 41 produced while no read-out signal is input from the pixel PXL and no output is input from the amplifier 42 or (ii) the output signal from the ADC 41 observed while the output is input from the amplifier 42.

For the purposes of random number generation, the 12-bit read-out result from the pixel can be binarized by comparing the result against the median. The randomness can be also enhanced by performing an XOR operation on the outputs from three or more pixels. The group of pixels subjected to an XOR operation can be selected by a pseudo random number generator.

The true random number generator 8212 having the above configurations and functions can contribute to reliably achieve high randomness, low power consumption, low cost and high information security.

The true random number R generated by the true random number generator 8212 is used to generate a codeword C of an error correction code by the encoding part 8213, and the codeword C is fed to the XOR 8214. The XOR 8214 calculates an exclusive logical or between the input data W and the codeword C, so that a 1/0 bit string or helper data SHD (WxorC) is generated. Unlike key data, the helper data SHD (WxorC) does not need to be concealed and is stored in the memory 86. The helper data SHD stored in the memory 86 is used by the key regenerating part 822 as the base data to regenerate the key.

The key regenerating part 822 includes a PUF response input part (Response) 8221 for recovery, an exclusive logical or circuit (XOR) 8222, a decoding part (Decode) 8223, an exclusive logical or circuit (XOR) 8224, and a hash (Hash) part 8225. The decoding part 8223 serves as an error correcting part.

In the key regenerating part 822, the input data W' including the variation information acquired by the information acquiring part 81, for example, the variation information of the threshold value VTH of the source follower transistor SF and the helper data SHD (WxorC) stored in the memory 86 are input into the XOR 8222. The helper data SHD (WxorC) is also input into the XOR 8224. The XOR 8222 calculates an exclusive logical or between the input data W' and the helper data WxorC, and the result is fed as data C' to the decoding part 8223. The decoding part 8223 decodes the data C' (CxorE), so that an estimated codeword C having the error E eliminated is generated. The estimated codeword C is fed to the XOR 8224. The XOR 8224 calculates an exclusive logical or between the estimated codeword C and the helper data WxorC, and the result is input as estimated data W into the hash part 8225. The hash part 8225 then generates a key KY based on the input estimated data W. The regenerated key KY is fed to the identification data generating part 84. If the input data W' has a little noise and the data C' is capable of being corrected, C'=C, W'=W and the key is regenerated. In this case, the regenerated key matches the initial key.

According to the above-described example, the key generating part 82 generates a unique key based on the variation information of the pixels or reading circuit 40. The key generating part 82 can be also configured to generate unique keys based on different pieces of variation information and perform a logical operation between the generated unique keys to acquire a final unique key. For example, the following configuration is also possible.

The key generating part 82 has a first function of generating a first unique key using variation information of the ADC 41, the amplifier (AMP) 42, or the S/H circuit 43 of the reading circuit 40 and a second function of generating a second unique key using the output from the SRAM of the column memory 45 of the reading circuit 40, and performs a logical operation on the first unique key generated by the first function and the second unique key generated by the second function to generate a final unique key.

The above configuration is also applicable to the case where the variation information of the pixels is used.

The image data generating part 83 performs predetermined signal processing on the read-out signal that has been read by the reading circuit 40 in the normal reading mode and subjected to predetermined processing, to generate two-dimensional image data IMG shown in, for example, FIG. 5. The image data generating part 83 feeds the generated image data IMG to the integrating part 85.

The image data generating part 83 feeds the acquired data AQD acquired from the solid-state imaging device 10 to the identification data generating part 84. Here, the acquired data AQD is at least one selected from the group consisting of pixel data, date data, temperature data, Global Positioning System (GPS) data.

The identification data generating part 84 combines the unique key KY generated by the key generating part 82 with the acquired data AQD acquired from the solid-state imaging device 10, to generate identification data DSCD. The identification data generating part 84 feeds the generated identification data DSCD to the integrating part 85.

As shown in FIG. 5, the integrating part 85 integrates the identification data DSCD generated by the identification data generating part 84 with the image data IMG generated by the image data generating part 83 based on the read-out data, and outputs the result as a final output from the sensor chip. For example, the integrating part 85 integrates the data such that the result contains, in the following order, a header HD, the identification data DSCD, and the image data IMG, as shown in FIG. 5.

As described above, the response data generating part 80, which is an encryption processing system, generates the unique key KY based on the variation information (variation information of the pixels or reading circuit) unique to the solid-state imaging device 10, combines the unique key KY with the acquired data AQD acquired from the solid-state imaging device 10 to generate the identification data DSCD, integrates the identification data DSCD with the image data IMG and outputs the result. Accordingly, if the information regarding the unique key is absent, no correct identification data can be generated. In this way, if the image is changed, for example, the fact of being changed can be found. Consequently, forgery is difficult.

The integrating part 85 may be configured to have a function of hierarchically masking the image using the key information to be integrated. Alternatively, the integrating part 85 may be configured to have a function of embedding an electronic watermark in the image using the key information to be integrated.

As described above, the CIS-PUF relating to the present embodiment operates in the normal image capturing mode (normal operational mode) MDU in which image capturing is carried out with the CDS circuit in operation, the security mode (PUF mode or response generation mode MDR) in which image capturing is carried out without placing the CDS circuit in operation, and the true random number generation mode MTRG in which a true random number is generated based on, for example, the read-out signal (information) including the FD reset noise of the pixel. The following briefly describes the operations performed in the normal operational mode, true random number generation mode MTRG, and response generation mode MDR. Here, the pixel part 20 can have pixel sharing configuration such that one floating diffusion FD, one source follower transistor SF-Tr, and one reset transistor RST-Tr are shared between a plurality of (in the present example, two) photodiodes PD and transfer transistors TG-Tr. The following description is made in relation to the pixel sharing configuration.

Figure 14:
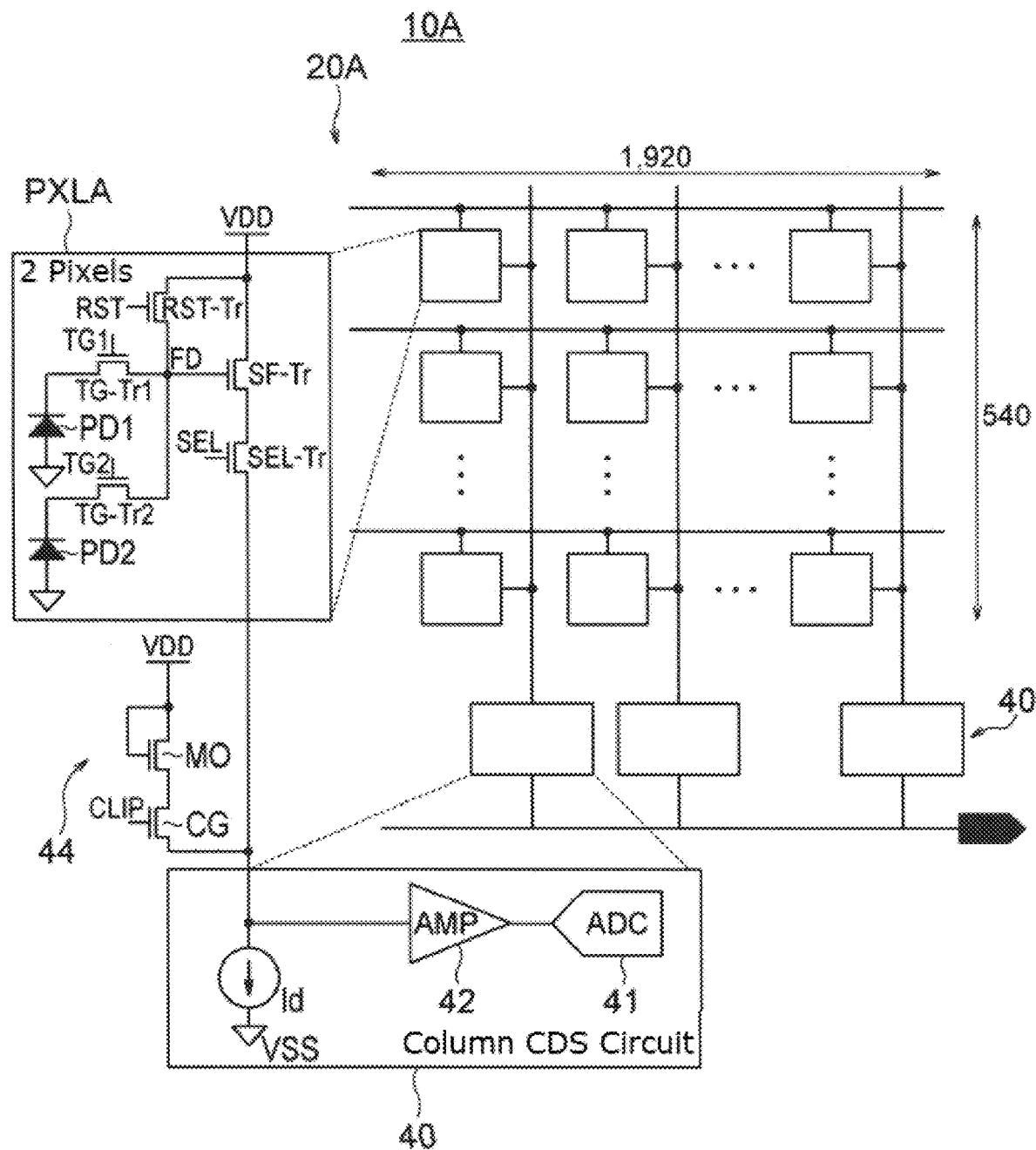
FIG. 14 generally shows a column reading circuit arranged for each column and a pixel part having a pixel sharing configuration relating to the first embodiment.

FIG. 14 briefly shows the column reading circuit arranged for each column and the pixel part having the pixel sharing configuration relating to the first embodiment.

The pixel part 20A shown in FIG. 14 has a pixel sharing configuration such that one floating diffusion FD, one source follower transistor SF-Tr serving as a source follower element, one reset transistor RST-Tr serving as a reset element, and one selection transistor SEL-Tr serving as a selection element are shared between a plurality of (in the present example, two) photodiodes PD1 and PD2, which are photoelectric converting elements, and a plurality of (in the present example, two) transfer transistors TG-Tr1, TG-Tr2, which are transfer elements.

In other words, the pixel PXLA of the CMOS image sensor shown in FIG. 14 includes the photodiodes PD1 and PD2, the transfer transistors TG-Tr1, TG-Tr2 driven by control signals TG1 and TG2, which are transfer clocks, the reset transistor RST-Tr driven by the control signal RST, which is a reset clock, the source follower (SF) transistor SF-Tr, and the selection transistor SEL-Tr driven by the control signal SEL, which is a selection clock. The two photodiodes PD1, PD2 share the reset transistor RST-Tr, source follower (SF) transistor SF-Tr, selection transistor SEL-Tr. This approach is widely used for recent fine pixels. Since PDs share the transistors, the PDs can occupy a large area relative to the predetermined pixel size, so that a larger region is capable of performing photoelectric conversion. This raises the sensitivity for detection of the incident light.

When the selection transistor SEL-Tr is turned on in a pixel, the power supply line VDD of the power supply voltage Vdd, the source follower (SF) transistor SF-Tr, the current source Id are connected in series in the pixel, to constitute a source follower circuit. This source follower circuit causes the voltage of the floating diffusion FD to be input into the ADC 41 via the AMP 42 of the reading circuit 40. The voltage of the floating diffusion FD is converted into a digital signal, which is output to the interface circuit via the switch SW41, which is driven by the control signal CLKH.

A clip circuit 44 is arranged at the end of the array of pixels. A clip gate CG, which is driven by a control signal CLIP serving as a clip clock, and a diode-connected transistor MO are arranged at the end of the array of pixels, to limit the amplitude of the pixel output voltage. In this way, the clip circuit 44 is used to realize stable operation.

Figure 15:
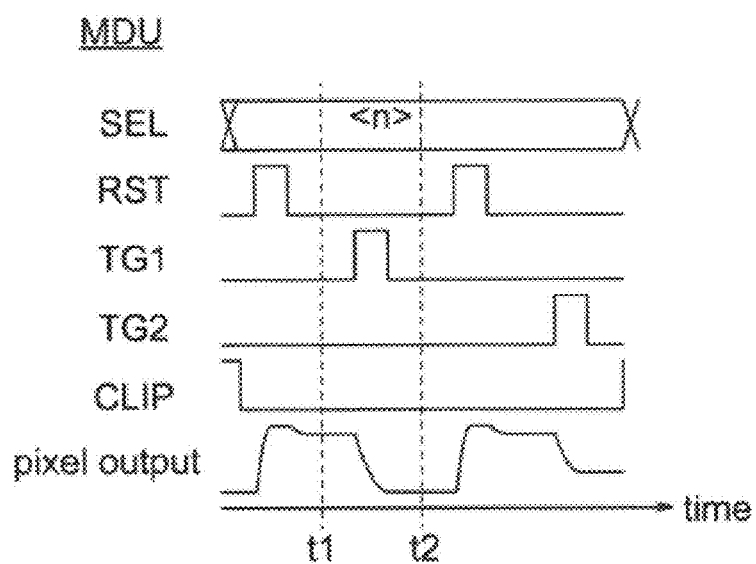
FIG. 15 shows operational waveforms in main parts of the solid-state imaging device of FIG. 14 in a normal operational mode.
Figure 16:
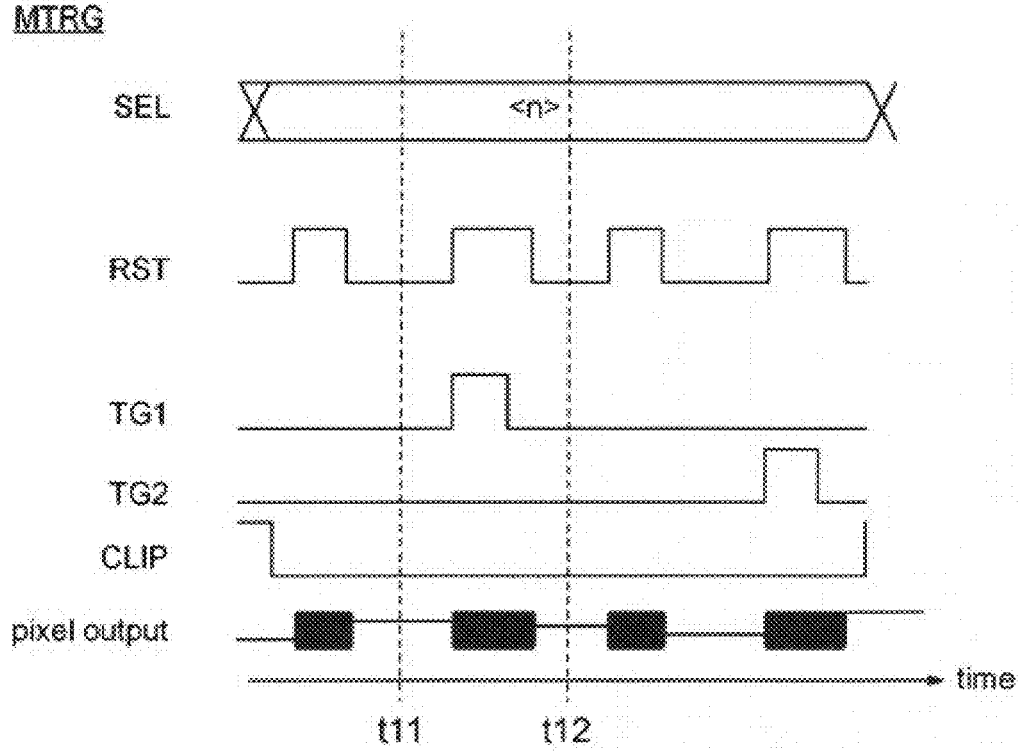
FIG. 16 shows operational waveforms in main parts of the solid-state imaging device of FIG. 14 in a true random number generation mode.
Figure 17:
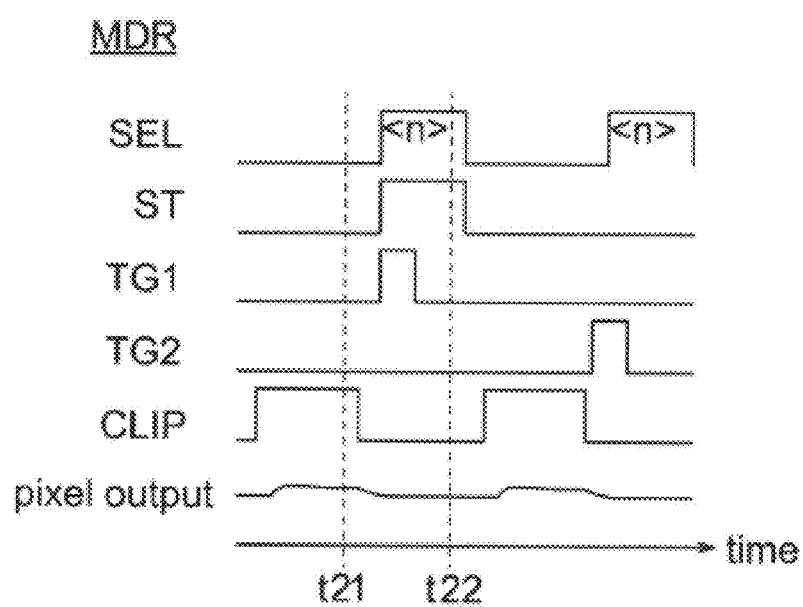
FIG. 17 shows operational waveforms in main parts of the solid-state imaging device of FIG. 14 in a response generation mode.

The following briefly describes the operations performed by the solid-state imaging device 10A of FIG. 14 in the normal operational mode MDU, true random number generation mode MTRG and response generation mode MDR with reference to FIGS. 15, 16 and 17. FIG. 15 shows the operational waveforms in the main parts of the solid-state imaging device 10A of FIG. 14 in the normal operational mode MDU. FIG. 16 shows the operational waveforms in the main parts of the solid-state imaging device 10A of FIG. 14 in the true random number generation mode MTRG. FIG. 17 shows the operational waveforms in the main parts of the solid-state imaging device 10A of FIG. 14 in the response generation mode MDR.

<Operations performed in Normal Operational Mode MDU>

In the normal operational mode MDU, the control signal SEL of the n-th row transitions to the H level, so that the row is selected. Following this, while the control signal RST of the selected row is at the H level, the floating diffusion FD is reset, so that the reset voltage VRST (Vrst) is output from the source follower through the vertical signal line LSGN, retained in the following stage or ADC 41 at a timing t1 and converted into a digital signal. The electrons produced by the photoelectric conversion and then stored in the photodiode PD1 are transferred to the floating diffusion FD via the transfer transistor TG-Tr while the control signal TG1 is at the H level and converted into voltage. This signal voltage VSIG (Vsig) is output from the source follower, retained in the following stage or the ADC 41 at a timing t2 and converted into a digital signal. The same series of operations can be performed to read the photodiode PD2. The input/output characteristics of the source follower circuit is expressed by the following expression.

$$V_{out} = V_{in} - V_{gs} = V_{in} - V_{th} - \Delta V_{th} - \sqrt{\frac{2I_d}{\beta}}$$

Here, Vgs, Vth, ΔVth, β and Id respectively denote the gate-source voltage, the threshold voltage of the source follower (SF) transistor SF-Tr, the substrate bias voltage, a coefficient proportional to the transistor size, and the bias current. As for these variables, individual transistors take different values due to the variations caused during the manufacturing process. Therefore, there are variations in pixel output voltage among the pixels. Such variations contain several types of components and the offset component can be eliminated by the CDS, since the CDS calculates the difference between the reset signal (reset level) and the luminance signal (signal level). The output resulting from the CDS is expressed by the following expression.

$$V_{CDS} = V_{RST} - V_{gs,RST} - (V_{SIG} - V_{gs,SIG}) \quad \text{Expression 2}$$
$$\approx A(V_{RST} - V_{SIG})$$

Here, A denotes the gain of the source follower circuit. The variations in gain among the pixels still remains but is expressed as a coefficient proportional to the difference between the reset level VRST and the luminance level (signal level) VSIG, in other words, the luminance. Thus, even a minute signal obtained when the luminance is low can be detected.

<Operations performed in True Random Number Generation Mode MTRG>

In the true random number generation mode MTRG, as shown in FIG. 16, the control signal SEL of the n-th row transitions to the H level, so that the row is selected. Following this, while the control signal RST of the selected row is at the H level, the floating diffusion FD is reset, so that the reset voltage VRST11 (Vrst11) is output from the source follower through the vertical signal line LSGN, retained in the following stage or the ADC 41 at a timing t11 and converted into a digital signal. Subsequently, while the control signal RST of the selected row is at the H level, the control signal TG1 is set at the H level for, for example, a 1H period, so that the photodiode PD1 and the floating diffusion FD are reset, the reset voltage VRST12 (Vrst12) is output from the source follower through the vertical signal line LSGN, retained in the following stage or the ADC 41 at a timing t12 and converted into a digital signal. The same series of operations can be performed to read the photodiode PD2.

<Operations performed in Response Generation Mode MDR>

In the response generation mode MOR, the CDS is skipped to output the variations among the pixels. The clip pixel output is used as the reference level to read each pixel. In this way, the variation pattern can be output without the need of changing the circuit operations after the AMP 42.

In the response generation mode MDR, as shown in FIG. 17, the control signal CLIP is first controlled to transition to the H level, so that the clip circuit 44 is selected. The source follower (SF) transistor MO of the clip circuit 44 is short-circuited to the power supply line VDD of the power supply voltage Vdd, so that the power supply voltage Vdd is output through the source follower, retained in the following stage or the ADC 41 at a timing t21, and converted into a digital signal. Next, the control signal SEL of the n-th row transitions to the H level, so that the row is selected. At the same time, the control signals RST and TG1 of the selected row also transition to the H level, so that the photodiode PD1 and the floating diffusion FD are reset. This is done to prevent the electrons overflowing from the photodiode PD1 to the floating diffusion FD when the luminance is high from being detected. Since the floating diffusion FD is short-circuited to the power supply line VDD of the power supply voltage Vdd via the reset transistor RST-Tr, the power supply voltage Vdd is output through the source follower, retained in the following stage or the ADC 41 at a timing t22, and converted into a digital signal.

The circuits of the following stages operate in the same manner as in the normal operational mode MDU, and the difference between the clip signal and the pixel reset signal is output. In the response generation mode MDR, the difference between the non-correlated signals is output. Accordingly, differential double sampling (DDS) is performed. The output resulting from the DDS is expressed by the following expression.

$$V_{DDS} = V_{dd} - V_{gs0,Vdd} - (V_{dd} - V_{gs,Vdd}) \quad \text{Expression 3}$$
$$= V_{gs,Vdd} - V_{gs0,Vdd}$$

$$= (V_{th} - V_{th0}) + (\Delta V_{th,Vdd} - \Delta V_{th0,Vdd}) +$$

$$\left( \sqrt{\frac{2I_d}{\beta}} - \sqrt{\frac{2I_d}{\beta_0}} \right)$$

Here, Vgs0, Vth0, ΔVth0 and β0 respectively denote the gate-source voltage of the clip circuit 44 and the source follower (SF) transistor, the threshold value of the SF transistor, the substrate bias voltage, and a coefficient proportional to the transistor. As is apparent from above, only the difference in Vth, ΔVth and β of the pixel can be output with reference to the clip circuit 44. The above series of operations are performed on all of the pixels, so that the manufacturing variations can be extracted regarding the characteristics of the device including 2 million pixels, for example.

On the other hand, the variables Vth0, β0 and Id take the same value among the pixels in each column and are the components attributable to the current source and the clip circuit 44. The manufacturing variations in these variables are column-wise variations. Accordingly, the output signal resulting from the DDS has the column-wise variations superimposed on the pixel-wise variations. The column-wise variations compromise the randomness of the variation signal pattern for the array of pixels.

As described above, in the first embodiment, the signal processing circuit 70 performs predetermined signal processing on the read-out signal that has been read by the reading circuit 40 and subjected to predetermined processing to generate two-dimensional image data. In the present embodiment, the response data generating part 80, which is an encryption processing system, is configured to, in order to prevent unauthorized usage, falsification and forgery of images, generate a unique key KY based on variation information (variation information of pixels or reading circuit) unique to the solid-state imaging device 10, combine the unique key KY with the acquired data AQD acquired by the solid-state imaging device 10 to generate identification data DSCD, integrate the identification data DSCD with the image data IMG and output the result. Thus, correct identification data can not be generated if the information relating to the unique key KY is absent.

The fuzzy extractor relating to the first embodiment basically includes the initial key generating part 821 and the key regenerating part 822. The initial key generating part 821 includes the true random number generator 8212. The true random number generator 8212 is arranged to correspond to the column output from the pixel part 20 or the pixel signal read from the pixel by the reading part 90 in the true random number generation mode and capable of generating a highly random true random number at a low cost using a read-out signal read from a column signal processing part of the reading part for processing a column output signal input thereto. The initial key generating part 821 is configured to generate helper data and an initial key based on the true random number generated by the true random number generator and variation information that is acquired as a response when the initial key is generated. The key regenerating part 822 is configured to, when a key is regenerated, generate a unique key based on helper data acquired when the initial key is generated and variation information that is acquired as a response including an error when the key is regenerated. Accordingly, the first embodiment can reliably achieve high randomness, low power consumption, low cost and high information security When a random number is generated in the first true random number generation mode MTRG1, in which the pixel signal read out from the pixel is used to generate a true random number, the selected pixel is read multiple times (for example, 128 times). This can eliminate the FPN and optimize the randomness. Alternatively, a plurality of (for example, 128) pixels can be selected from a row of pixels. In this case, the reading speed is optimized for the CIS including the column reading circuit 40. Furthermore, a plurality of (for example, 128) pixels can be selected from a column of pixels. In this case, the addresses of the selected pixels can be given by a digital pseudo random number generator. The addresses of the selected pixels can be the addresses of the optical black (OB) pixels in order to avoid optical overflow when illumination has high intensity.

The reading part 90 may be configured as shown in FIG. 9 in order to reliably achieve high randomness. To be more specific, the reading part 90 includes a plurality of column signal processing parts 400 (for example, each including an amplifier 42 and an ADC 41) and a multiplexer 410. The column signal processing parts 400 are each arranged to correspond to at least one of the column outputs from the pixel part 20 and configured to process the column output signal input thereinto. The multiplexer 410 is configured to shuffle the destinations of the column output signals from the pixel part 20 so that a given column output signal is input into a column signal processing part different from the intended column signal processing part that is arranged to correspond to the given column output signal. With such configurations, the reading part 90 can reliably achieve high randomness.

In addition, the randomness can be enhanced by performing an XOR (exclusive logical or) operation on pixel signals output from two pixels.

Furthermore, when a random number is generated in the second true random number generation mode MTRG2, the read-out signal read out from the column signal processing part 400 of the reading part 90 includes the output signal from the ADC 41 observed while no read-out signal is input from the pixel PXL and no output is input from the amplifier 42, or the output signal from the ADC 41 observed while the output is input from the amplifier 42.

To generate a random number, the 12-bit read-out signal from the pixel can be binarized by comparing the values against the median. The randomness can be also enhanced by performing an XOR operation on the outputs from three or more pixels. The group of pixels subjected to an XOR operation can be selected by a pseudo random number generator.

Second Embodiment

Figure 18:
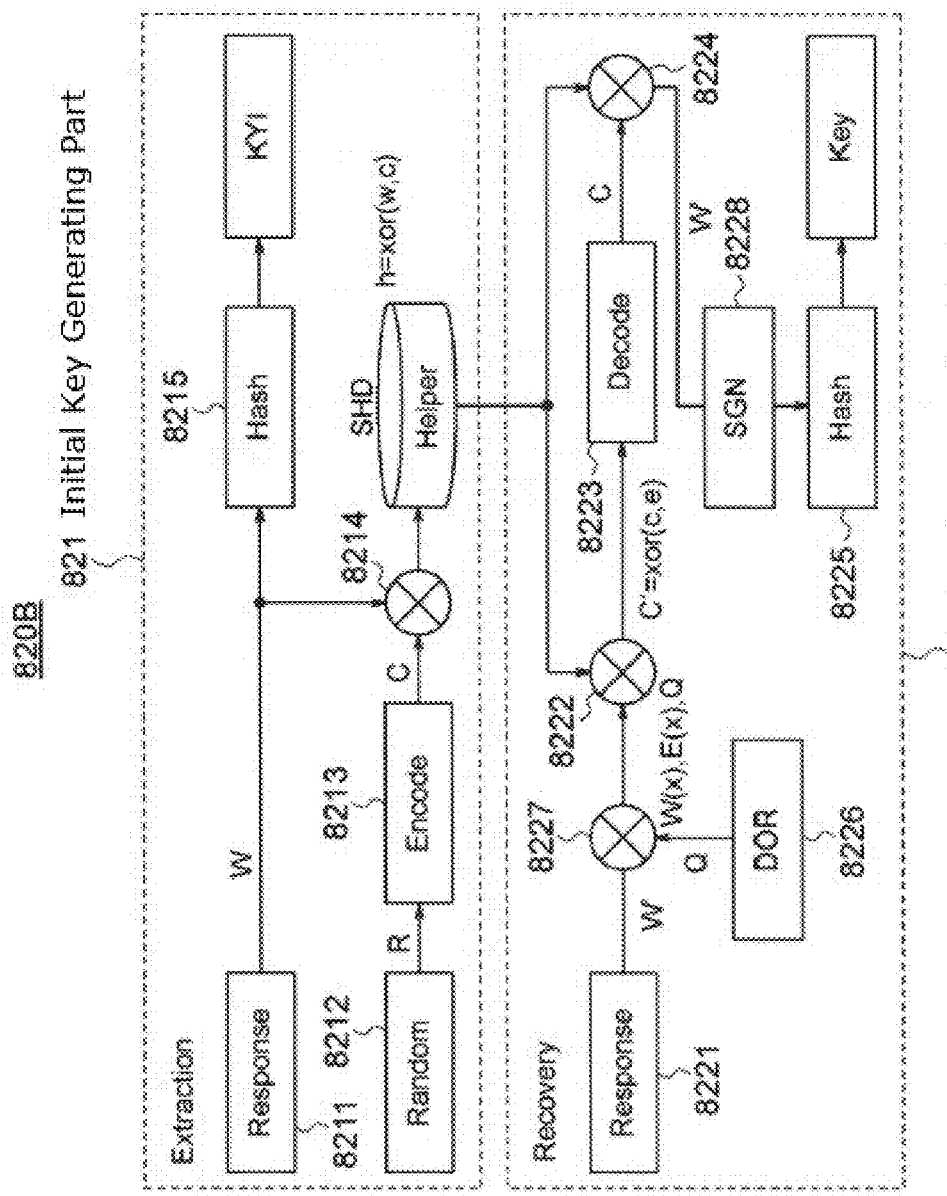
FIG. 18 shows an example configuration of a fuzzy extractor applicable to a unique key output part of a key generating part relating to a second embodiment of the present invention.

FIG. 18 shows an example configuration of a fuzzy extractor applicable to a unique key output part of a key generating part relating to a second embodiment of the present invention.

A fuzzy extractor 820B shown in FIG. 18 relating to the second embodiment is different from the fuzzy extractor 820 relating to the first embodiment in the following points. The fuzzy extractor 820B relating to the second embodiment is configured to be capable of acquiring reliability information of bits of a PUF response in relation to the digital values Vout produced by the CIS-PUF and using the acquired reliability information to a soft decision fuzzy extractor (key regenerating part). In other words, in the second embodiment, the CIS-PUF can determine reliability information based on variation information, which is a PUF response generated when a key is regenerated. Accordingly, the initial key generation is performed in the same manner as hard decision, and the key regeneration involves appending reliability based on the acquired data to make a soft decision. In other words, the fuzzy extractor 820B additionally includes, in the key regenerating part 822B, new components of a reliability information acquiring part 8226, an XOR 8227 and a code converting part (SGN) 8228.

In the key regenerating part 822B, the reliability information acquiring part 8226 acquires reliability information Q determined based on variation information, which is acquired as a response including an error when a key is regenerated, and feeds the reliability information Q to the XOR 8227. The XOR 8227 performs a logical operation on the reliability information Q and the variation information W(x)E, which is acquired as a response including an error when a key is regenerated, to acquire first data W(x)E(x)Q and feeds the first data W(x)E(x)Q to the XOR 8222. Here, the variation information W(x)E is provided as −1/1 data, which is obtained by converting the 1/0 data, in order to be compatible with soft decision. The XOR 8222 performs a logical operation on the helper data W(x)C and the first data W(x)E(x)Q including the reliability information Q to acquire second data C(x)E(x)Q which results from a logical operation on the codeword C of the error correction code, the error component E and the reliability information Q and feeds the second data C(x)E(x)Q to the decoding part 8223. Here, the helper data W(x)C is also provided as −1/1 data, which is obtained by converting the 1/0 data, in order to be compatible with soft decision. The decoding part 8223 decodes the second data C(x)E(x)Q through correlation decoding using the reliability information Q to acquire an estimated codeword C, and feeds the estimated codeword C' to the XOR 8224. The codes are converted such that "0" and "1" are respectively replaced with "1" and "−1" in order to calculate an inner product in relation to the correlation decoding used for this soft decision. The XOR 8224 performs a logical operation on the estimated codeword C' provided by the decoding part 8223 and the helper data W(x)C to acquire estimated variation information W, and feeds the estimated variation information W' to the code converting part 8228. The code converting part 8228 converts the −1/1 data back into 1/0 data, and feeds the result to the second hash part 8225. The second hash part 8225 subjects the estimated variation information W' to a hash function to acquire a hash value and outputs the hash value as a regenerated key K'.

If the estimated codeword C' provided by the error correcting part matches the codeword C obtained when the initial key is generated, the regenerated key is deemed to match the initial key.

<Description of Reliability Information>

The following describes the reliability information.

When generating the variation information of the pixels or reading part 90 as a PUF response, the solid-state imaging device 10B relating to the second embodiment outputs multi-bit, for example, 12-bit digital values (Vout) corresponding to the variations of the pixel transistors. The threshold voltage values of adjacent transistors are compared to determine which is larger, so that 1/0 response data can be acquired. In the solid-state imaging device 10B, when there is a large difference between the digital values Vout of the pixel transistors compared with each other to determine which is larger, changes in environmental conditions such as noise, temperature and voltage do not result in inverting the relation between the threshold voltage values VTH compared against each other. Thus, the corresponding bit can be determined as stable.

The fuzzy extractor relating to the present embodiment can acquire reliability information of the bits of the PUF response in relation to the digital values Vout acquired by the CIS-PUF and use the acquired reliability information in the soft decision fuzzy extractor (key regenerating part). In other words, in the second embodiment, the CIS-PUF can determine reliability information based on variation information, which is a PUF response generated when a key is regenerated. Accordingly, the initial key generation is performed in the same manner as hard decision, and the key regeneration involves appending reliability based on the acquired data to make a soft decision.

In this way, the solid-state imaging device 10 relating to the present embodiment does not need to measure a plurality of responses for each chip in advance for the purposes of acquiring reliability information or to give reliability to helper data. This can prevent increased data from being saved in the fuzzy extractor when an initial key is generated and contribute to generate highly secretive and unique response data. Accordingly, the present embodiment can reliably prevent falsification or forgery of images.

As described above, the solid-state imaging device 10B relating to the second embodiment uses, in the key generating part 82 of the response data generating part 80 serving as an encryption processing system, a fuzzy extractor including a true random number generator and generates stable response data by making an effective use of multi-bit or, for example, 12-bit digital values Vout corresponding to variations of the pixel transistors. The solid-state imaging device 10B acquires reliability information Q of the bits of the PUF response in relation to the digital values Vout acquired by the CIS-PUF and uses the acquired reliability information Q in the soft decision fuzzy extractor (key regenerating part). In other words, in the second embodiment, the CIS-PUF can determine reliability information based on a PUF response (variation information) generated when a key is regenerated. Accordingly, the initial key generation is performed in the same manner as hard decision, and the key regeneration involves appending reliability based on the acquired data to make a soft decision.

In the second embodiment, when regenerating a key, the response data generating part 80 generates a unique key using the helper data resulting from the initial key generation, variation information obtained when the key is regenerated, and reliability information Q determined based on the variation information obtained when the key is regenerated. In the second embodiment, the variation information obtained as a PUF response is acquired as a multi-bit, for example, 12-bit digital value Vout, where each bit corresponds to two output values, and the response data generating part 80 (key generating part 82) uses the two output values of the variation information as reliability information Q. The difference between the two output values of the variation information, which is obtained as the CIS-PUF response, can be used to determine the likelihood of bit inversion. The response data generating part 80 determines reliability based on the difference between the two output values of the variation information acquired when a key is regenerated.

Figure 19A:
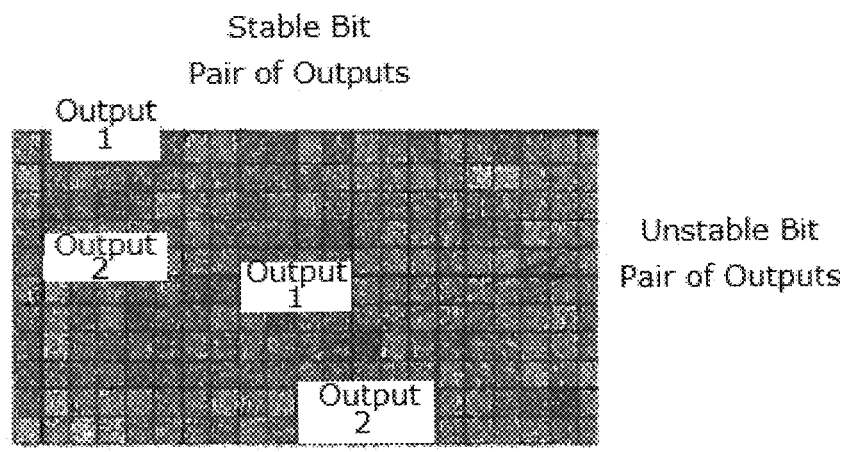
FIGS. 19A to 19C include histograms of the pair of outputs for a stable bit and the pair of outputs for an unstable bit in variation information acquired as a PUF response of a CMOS image sensor PUF (CIS-PUF).
Figure 19B:
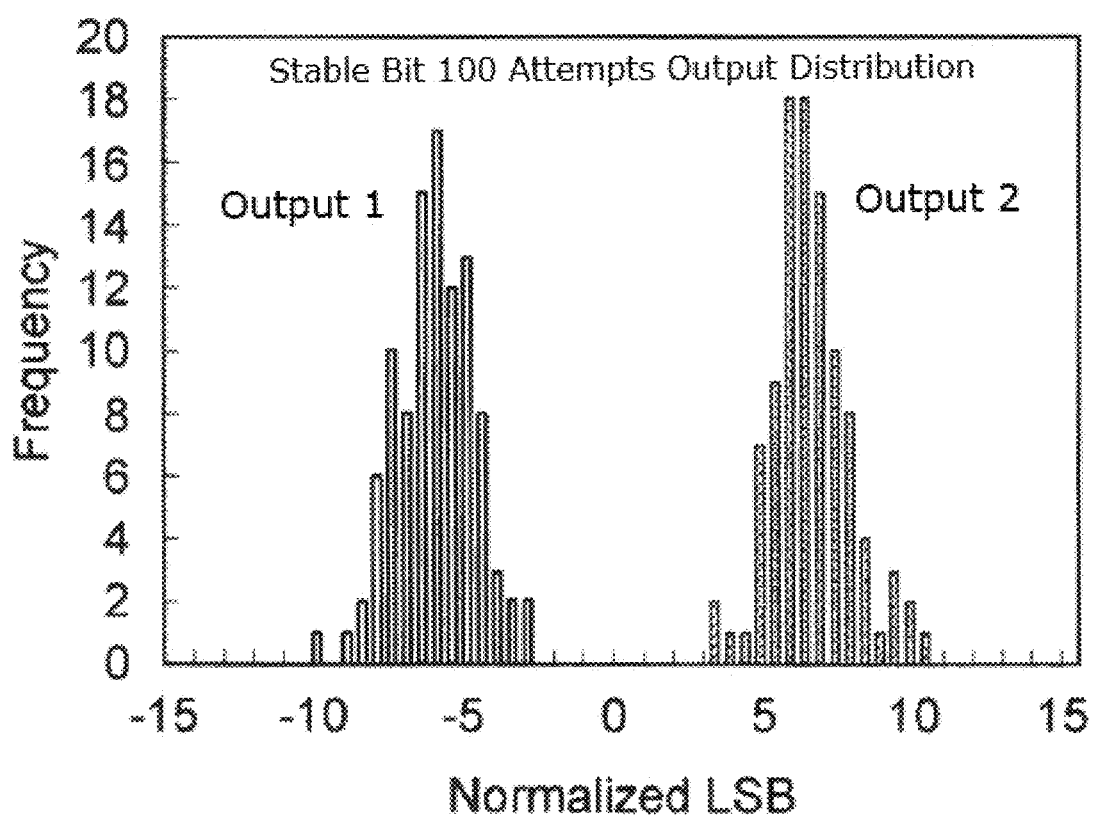
Figure 19C:
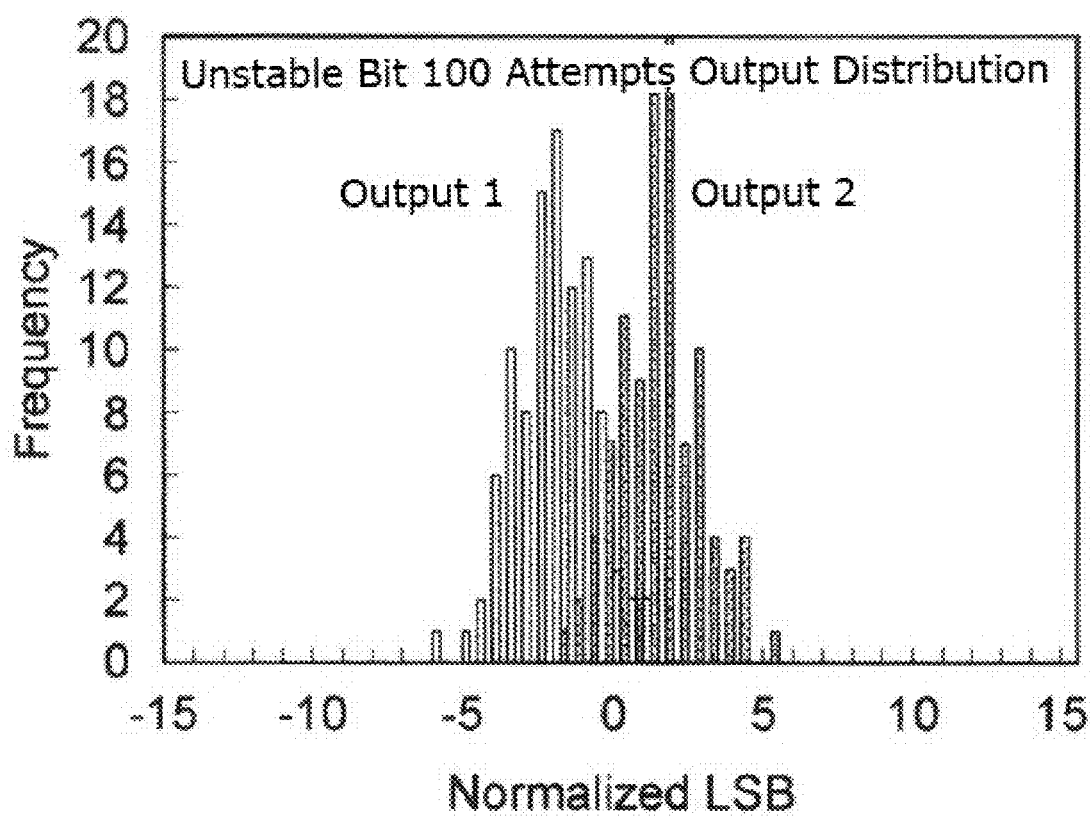

FIGS. 19A to 19C include histograms for the pair of outputs for the stable bit and the pair of outputs for the unstable bit in variation information, which is acquired as a PUF response by a CMOS image sensor PUF (CIS-PUF). FIG. 19A shows an example of the pixel part 20, FIG. 19B shows an output distribution for a stable bit obtained by 100 attempts, and FIG. 19C shows an output distribution for an unstable bit obtained by 100 attempts.

In the variation information of the pixels obtained as a CIS-PUF response, each bit corresponds to two outputs. The difference between the two outputs can be used to determine the likelihood of bit inversion. Therefore, even if reliability information as to inversion is not recorded in the helper data when an initial key is generated, reliability information can be determined based on the response data obtained when a key is regenerated and used for soft decision. FIGS. 19B and 19C are histograms for the pair of outputs for the stable bit and the pair of outputs for the unstable bit, which are obtained as a result of 100 attempts. When each bit corresponds to a first output and a second output, the first and second outputs both have a distribution with a constant σ around an average value and have similar shapes. The variations is affected by random noise, which accumulates as each attempt is made.

As described above, the second embodiment determines reliability based on the difference between the two output values of the variation information, which is acquired as a PUF response when a key is regenerated. The following briefly describes a column reading circuit arranged for each column and the pixel part. The column reading circuit includes an information acquiring part that constitutes the main part of the CMOS image sensor PUF (CIS-PUF) and that is suitable for acquiring variation information having two output values. The following then describes how to specifically generate a PUF response (variation information) and how to set reliability information Q. The description of the fuzzy extractor includes the results of comparing, in terms of error correction capability, a common fuzzy extractor (hard decision fuzzy extractor) and a soft decision fuzzy extractor that performs soft decision when an initial key is generated and a key is regenerated.

FIG. 14, mentioned above, briefly describes the column reading circuit of the present embodiment arranged for each column and the pixel part. The column reading circuit includes an information acquiring part that constitutes the main part of the CMOS image sensor PUF (CIS-PUF) and that is suitable for acquiring variation information having two output values.

The pixel part 20A and column reading circuit 40 shown in FIG. 14 is configured to determine which one of vertically (in the top-to-bottom direction in FIG. 14) adjacent two pixels is larger (by performing subtraction or the like) to perform binarization, for the purposes of enhancing the reproducibility of the variation signal and improving the uniqueness of the variation pattern.

<Brief Description of CIS-PUF of FIG. 14>

The following now briefly describes the CIS-PUF shown in FIG. 14. The CIS-PUF uses the variations among the characteristics of the pixels of the CMOS image sensor to generate a PUF response (pixel variation information) unique to each device. As described above, the characteristics variations include fixed pattern noise (FPN) occurring at a fixed position and random noise randomly occurring independently from the positions of the pixels. In the normal operational mode MDU, the CMOS image sensor performs correlated double sampling (CDS), which calculates the difference between the reset potential (VRST) and the signal potential (VSIG) for each pixel, in order to eliminate the characteristics variations.

The CIS-PUF also operates in the response generation mode (PUF mode) MDR, in which the signals are read out without using the CDS, in order to acquire variation information for the purposes of generating a PUF response. In the output acquired in the PUF mode, the pixel variations can be dominant.

The solid-state imaging device (CMOS image sensor) 10A, which is a CIS-PUF, shown in FIG. 14 has an array of 1,920×1,080 pixels (full HD). In the solid-state imaging device (CMOS image sensor) 10A, two adjacent pixels in the vertical direction (in the top-to-bottom direction in the drawing) share a source follower transistor SF-Tr. Therefore, the solid-state imaging device (CMOS image sensor) 10A has 1,920×540 source follower transistors SF-Tr. In the PUF mode, the potential fed from the clip circuit 44 provided for each column is used as the reference potential, the difference is calculated between the reference potential and the reset potential of each pixel. In this way, pixel-wise variations is extracted.

<Generation of PUF Response in CIS-PUF in FIG. 14>

Figure 20:
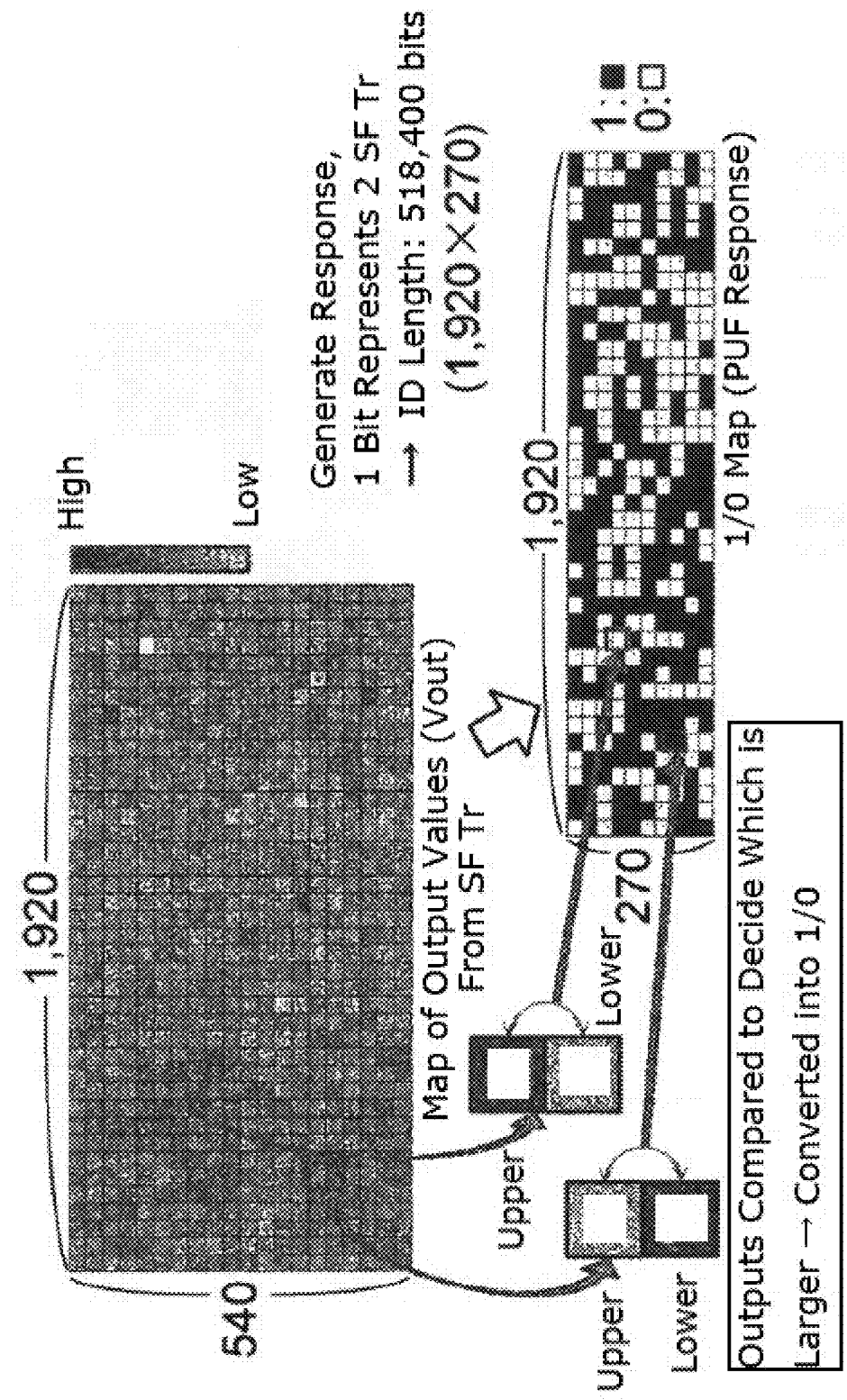
FIG. 20 shows how to generate a PUF response using pixel variations in the CIS-PUF of FIG. 14.

The following now briefly describes how to generate a PUF response at the CIS-PUF shown in FIG. 14. FIG. 20 shows how to generate a PUF response using pixel variations in the CIS-PUF of FIG. 14.

When generating a PUF response using the pixel variations, the CIS-PUF compares the output values Vout (the digital output from the AD converter 41) of the two source follower transistors SF-Tr adjacent to each other in the vertical direction (top-to-bottom direction) to determine which is larger to output one bit. In the example shown in FIG. 20, the output values Vout adjacent to each other in the vertical direction are compared against each other to determine which is larger. When the upper output value is larger than the lower output value (upper>lower), "1" is output. When the upper output value is smaller than the lower output value (upper<lower), "0" is output.

The actually measured CMOS image sensor has 1,920×540 source follower transistors SF-Tr. The output values from the source follower transistors SF-Tr adjacent to each other in the vertical direction are compared against each other to determine which is larger, so that 1920×270 pieces of 1/0 data (PUF response) are generated. Accordingly, one CIS-PUF chip can produce a response of approximately 0.5M bits.

Figure 21:
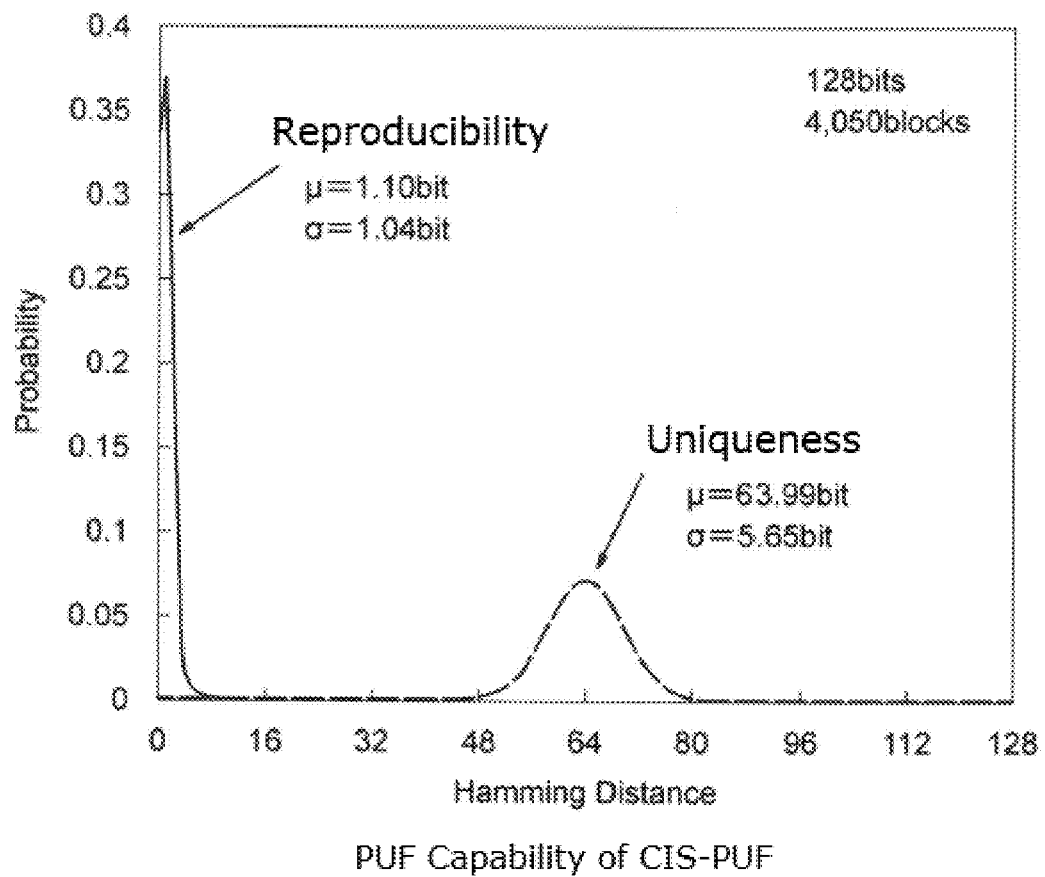
FIG. 21 illustrates the reproducibility and uniqueness exhibited by the PUF function achieved by the response generating scheme shown in FIGS. 14 and 20.

FIG. 21 illustrates the reproducibility and uniqueness of a PUF function achieved by the response generating scheme shown in FIGS. 14 and 20.

As for the reproducibility shown in FIG. 21, an average is calculated based on the outputs of 100 attempts (100 images) and used as a reference response. FIG. 21 shows the humming distance (HD) calculated between the reference response and the response of each attempt (each image). The response made up by 1,920×270 bits is partitioned every 128 bits to obtain 4,050 blocks, and the distribution is based on the results of 4,050 blocks×15 chips. The uniqueness shown in FIG. 21 is calculated as the humming distances (HDs) between the reference responses of different 15 chips. In FIG. 21, the uniqueness is shown as a distribution of 4,050 blocks, which is produced by partitioning the responses every 128 bits, like the reproducibility.

As shown in FIG. 21, extremely high reproducibility is achieved. The average value is 1.10 bits from among 128 bits (the inversion likelihood=0.86%), and the largest value is 8 bits (the inversion likelihood=6.25%). Similarly, high uniqueness can be proved. The average value is 63.99 bits or approximately equal to an ideal value (64 bits).

<Unstable Bit of CIS-PUF>

Figures 22A, 22B:
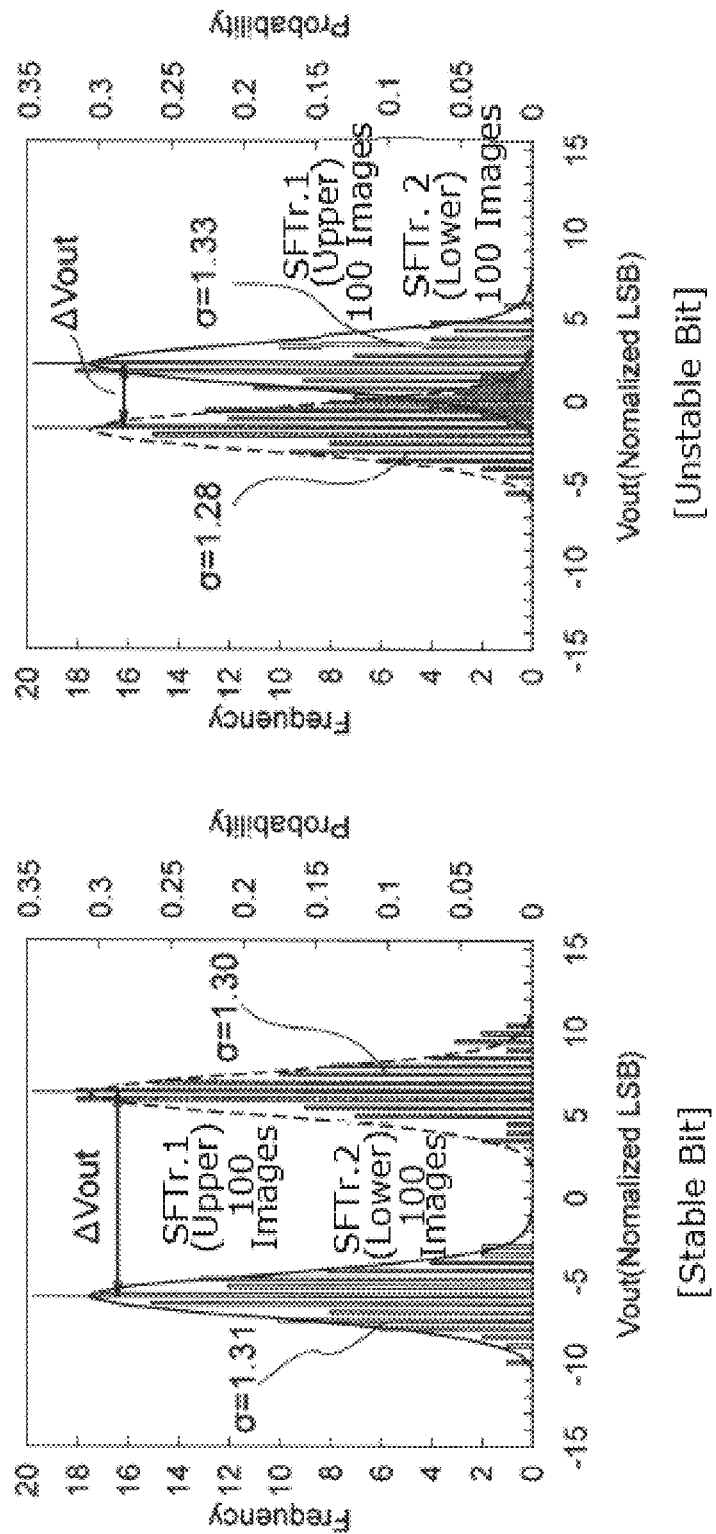
FIGS. 22A and 22B show stable and unstable bits of the PUF response acquired by the response generating scheme shown in FIGS. 14 and 20.

The following studies the unstable bit of the CIS-PUF shown in FIG. 14. FIGS. 22A and 22B show stable and unstable bits of a PUF response obtained by the response generating scheme shown in FIGS. 14 and 20. FIG. 22A shows a distribution of outputs from two source follower transistors SF-Tr for the stable bit, which results from 100 attempts. FIG. 22B shows a distribution of outputs from two source follower transistors SF-Tr for the unstable bit, which results from 100 attempts.

FIGS. 22A and 22B also show an average output and identify the difference between two average outputs by $\Delta$Vout. These average outputs are affected by the FPN (fixed pattern noise), which is a component of the variations occurring in the CMOS image sensor, and one average output is defined for each source follower transistor SF-Tr output. On the other hand, the distribution around the average output is affected by the random noise, and each SF-Tr output has a similar distribution with constant $\sigma$.

As is apparent from FIGS. 22A and 22B, the difference Vout is large for the stable bit relative to the variations in output among respective attempts. As a result, the relation between the outputs as to which is larger is not inverted depending on the respective attempts. On the other hand, the difference $\Delta$Vout between the average outputs is small for the unstable bit. As a result, the relation between the outputs as to which is larger can be inverted depending on the respective attempts and bit inversion may occur. Considering the above, the CIS-PUF shown in FIG. 14 and the like is capable of estimating the likelihood of bit inversion for a pair of source follower transistors SF-Tr by referring to the difference between their average outputs $\Delta$Vout.

The following describes how to set the reliability information. In the second embodiment, the key generating part 82 of the response data generating part 80 uses a fuzzy extractor when regenerating a key, to generate a unique key using the helper data acquired by generating an initial key, variation information acquired when a key is regenerated, and reliability information determined based on the variation information acquired when the key is regenerated. As described above, in the second embodiment, the variation information acquired as a PUF response is in the form of a multi-bit (in the present example, 12-bit) digital value Vout, where each bit corresponds to two output values, and the key generating part 82 uses, as reliability information, the two output values of the variation information acquired as a PUF response.

In the second embodiment, as described above, the difference between the two output values of the variation information acquired as a PUF response can be used to determine the likelihood of bit inversion. The key generating part 82 determines reliability based on the difference between the two output values of the variation information acquired when a key is regenerated.

The key generating part 82 can employ, for example, two approaches to determine and set reliability.

<First Reliability Setting Method>

According to a first reliability setting method, the key generating part 82 assumes that a first difference $\Delta$Vout_get between two output values of the variation information acquired when a key is regenerated is the same as a second difference $\Delta$Vout between the averages of the output values. Under this assumption, the key generating part 82 further assumes that, as the first difference $\Delta$Vout_get increases, the area of the overlap between the two output value distributions decreases and the likelihood of bit inversion decreases, and as the first difference $\Delta$Vout_get decreases, the area of the overlap between the two output value distributions increases and the likelihood of bit inversion increases. Under these assumptions, the key generating part 82 sets the reliability. The key generating part 82 sets the reliability such that the reliability takes a minimum when the area of the overlap between the two output value distributions, which is estimated based on the first difference $\Delta$Vout_get, takes a maximum and the reliability increases toward the maximum as the area of the overlap decreases. Alternatively, the key generating part 82 sets the reliability such that the reliability takes a maximum when the area of the overlap between the two output value distributions, which is estimated based on the first difference $\Delta$Vout_get, takes a minimum and the reliability decreases toward the minimum as the area of the overlap increases.

<Second Reliability Setting Method>

According to a second reliability setting method, the key generating part 82 assumes that a first difference $\Delta$Vout_get between two output values of the variation information acquired when a key is regenerated is different from a second difference $\Delta$Vout between averages of the output values, that acquired values vary among respective attempts, and that there are both cases where the first difference $\Delta$Vout_get is larger than the second difference $\Delta$Vout and where the former is smaller than the latter. Based on these assumptions, the key generating part 82 considers how far the first difference $\Delta$Vout_get is different from the second difference $\Delta$Vout when setting the reliability. The key generating part 82 assumes that the first difference $\Delta$Vout_get is within the range of +−$\alpha$ of the second difference $\Delta$Vout and considers how far the first difference $\Delta$Vout_get is different from the second difference $\Delta$Vout when setting the reliability.

The following describes how to determine and set the reliability by the reliability information acquiring part 8226 of the soft-decision key regenerating part 822 more specifically with reference to the drawings.

According to the above description of the stable and unstable bits of the CIS-PUF, the second difference $\Delta$Vout, which is the difference between average values, is used by referring to the distributions of the outputs from two source follower transistors SF-Tr adjacent to each other in the vertical direction (the top-to-bottom direction). In the second embodiment, the reliability information Q of the CIS-PUF is generated based on the difference in output between the vertically adjacent two source follower transistors SF-Tr. The fuzzy extractor 820B, which is employed in the second embodiment, assumes that reliability is acquired with one shot when a key is regenerated. In the present embodiment, the difference in output value acquired with one shot between the vertically adjacent two source follower transistors SF-Tr is referred to as the first difference $\Delta$Vout_get.

Figure 23:
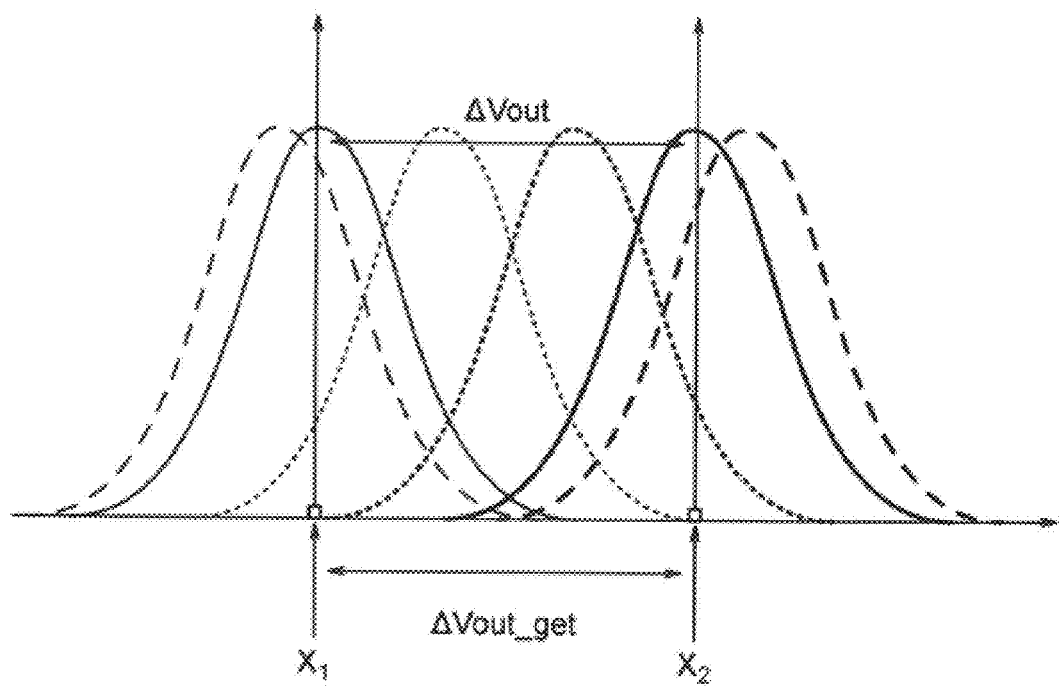
FIG. 23 is used to more specifically illustrate a method of determining and setting reliability relating to the second embodiment of the present invention.

FIG. 23 is used to more specifically illustrate a method of determining and setting reliability relating to the second embodiment of the present invention.

<Specific Description of First Reliability Setting Method>

According to the first reliability setting method, as shown in FIG. 23, the key generating part 82 assumes that the first difference $\Delta$Vout_get between two output values of the variation information acquired when a key is regenerated is the same as the second difference $\Delta$Vout between averages of the output values. Thus, $\Delta$Vout_get=$\Delta$Vout. In this case, if the first difference $\Delta$Vout_get is large, the distributions of the outputs from two source follower transistors SF-Tr do not overlap, and there is approximately zero probability of bit inversion. On the other hand, as the first difference $\Delta$Vout_get decreases, the area of the overlap between the distributions of the outputs from two source follower transistors SF-Tr increases, and there is a higher probability of bit inversion. Based on this, the key generating part 82 assumes that, as the first difference ΔVout_get increases, the area of the overlap between two output value distributions decreases and the likelihood of bit inversion decreases and that, as the first difference ΔVout_get decreases, the area of the overlap between two output value distributions increases and the likelihood of bit inversion increases when setting the reliability.

The key generating part 82 sets the reliability such that the reliability takes a minimum when the area of the overlap between the two output value distributions, which is estimated based on the first difference ΔVout_get, takes a maximum and the reliability increases toward the maximum as the area of the overlap decreases. Alternatively, the key generating part 82 sets the reliability such that the reliability takes a maximum when the area of the overlap between the two output value distributions, which is estimated based on the first difference ΔVout_get, takes a minimum and the reliability decreases toward the minimum as the area of the overlap increases.

To be more specific, when a key is regenerated, two outputs are acquired for each bit. The difference between these outputs is referred to as the first difference ΔVout_get. A single attempt does not tell how far the first difference ΔVout_get is different from the difference between their respective most frequent values obtained by statistically processing the outputs of multiple attempts (or average values) (this is referred to as the second difference ΔVout). A case is assumed where the two acquired outputs are the most frequent values (average values). In other words, ΔVout=ΔVout_get. Subsequently, output distributions are statistically derived (for example, normal distributions with certain a), and the area of the overlap between the two output distributions is calculated based on the second difference ΔVout. When the area of the overlap is 100%, the probability of the inversion is 50% and the reliability is set to 0. When the area of the overlap is 0%, the probability of the inversion is 0% and the reliability is set to 1. These cases are interpolated using a suitable function (for example, linear interpolation).

<Specific Description of Second Reliability Setting Method>

Figure 24B:
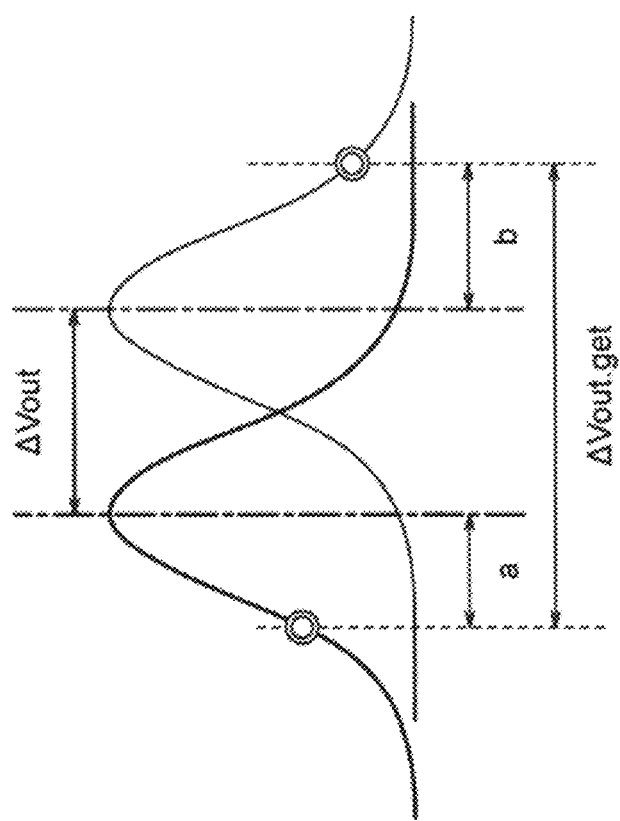
FIGS. 24A and 24B are first views used to illustrate a second method of setting reliability relating to the second embodiment of the present invention.
Figure 24A:
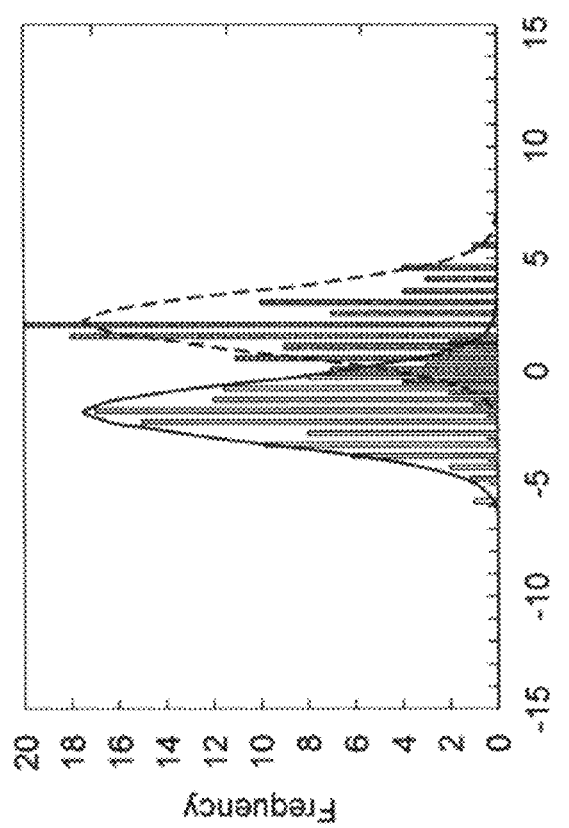

The following describes the second reliability setting method, which is more accurate than the first reliability setting method. FIGS. 24A and 24B are first views used to illustrate the second reliability setting method relating to the second embodiment of the present invention. FIGS. 25A to 25D are second views used to illustrate the second reliability setting method relating to the second embodiment of the present invention.

According to the second reliability setting method, the key generating part 82 assumes that the first difference ΔVout_get between two output values of the variation information acquired when a key is regenerated is different from the second difference ΔVout between averages of the output values, that acquired values vary among respective attempts, and that there are both cases where the first difference ΔVout_get is larger than the second difference ΔVout and where the former is smaller than the latter. Based on these assumptions, the key generating part 82 considers how far the first difference ΔVout_get is different from the second difference ΔVout when setting the reliability. The key generating part 82 assumes that the first difference ΔVout_get is within the range of +−α of the second difference ΔVout and considers how far the first difference ΔVout_get is different from the second difference ΔVout when setting the reliability.

According to the second reliability setting method, the outputs corresponding to one bit are each assumed to take a normal distribution around the most frequent value with constant σ. Under this assumption, the probability that an acquired output is shifted from the most frequent value is taken into consideration when the second difference ΔVout is calculated. Specifically, as shown in FIG. 24B, "a" denotes how much an acquired left output is shifted to the left from the most frequent value ("a" takes a negative value when the acquired left output is shifted to the right), and "b" denotes how much an acquired right output is shifted to the right from the most frequent value ("b" takes a negative value when the acquired right output is shifted to the left). Thus, ΔVout=ΔVout_get−a−b.

Figure 25A:
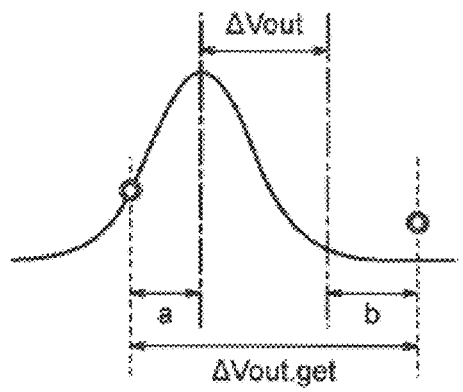
FIGS. 25A to 25D are second views used to illustrate the second method of setting reliability relating to the second embodiment of the present invention.
Figure 25B:
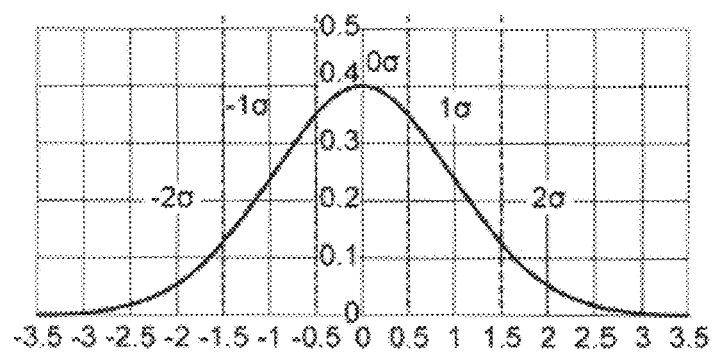
Figures 25C, 25D:
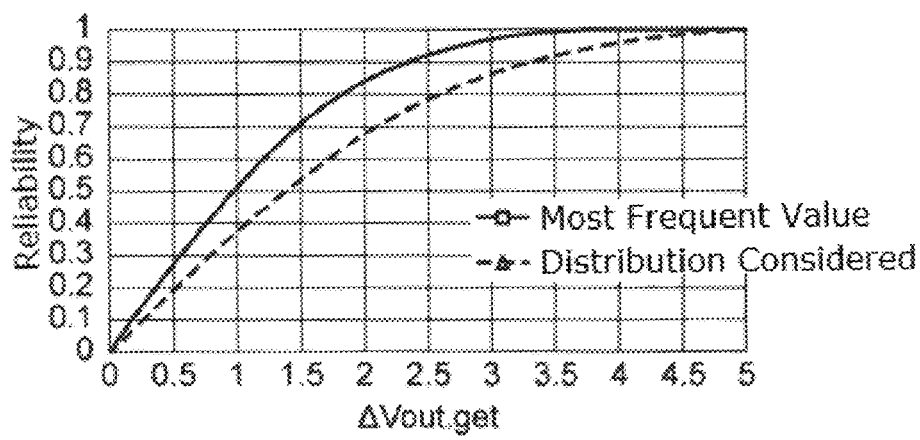

The probabilities of the respective values of "a" and "b" are calculated in the manner shown in FIGS. 25A to 25D. For example, if the value of a (the same applies to b) is within the range of +−0.5σ of the average value of the normal distribution, the output is moved to the average value. In this case, a (b)=0. If the value of a (b) is within the range of 1σ, the output is moved such that a(b)=+−1σ. If the value of a (b) is within the further outer range, the output is moved such that a(b)=+−2σ. The probabilities of the respective values of "a" and "b" are as shown in the table in FIG. 25D. These probabilities are multiplied by the reliability, which is calculated based on the second difference ΔVout (ΔVout=ΔVout_get−a−b), and the sum is calculated. The results are shown in FIG. 25C.

Figure 26:
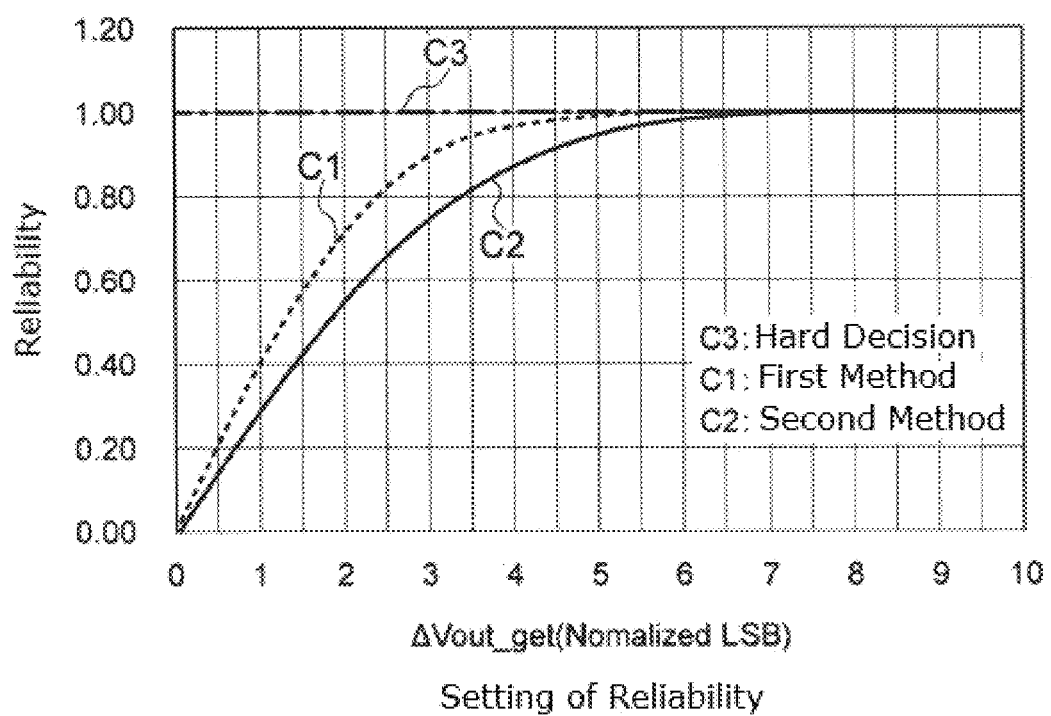
FIG. 26 illustrates how the reliability is related to a first difference ΔVout_get for the first and second methods of setting reliability relating to the second embodiment and a comparative example or a method of making decision using a common hard decision fuzzy extractor.

FIG. 26 illustrates how the reliability is related to the first difference ΔVout_get for the first and second methods of setting reliability relating to the second embodiment and a comparative example or a determining method using a common hard decision fuzzy extractor. In FIG. 26, a characteristic curve C1 represents how the reliability obtained by the first reliability setting method is related to the first difference ΔVout_get, a characteristic curve C2 represents how the reliability obtained by the second reliability setting method is related to the first difference ΔVout_get, and a characteristic curve C3 represents how the reliability obtained by the hard decision method or comparative example is related to the first difference ΔVout_get.

As is apparent from FIG. 26, the second reliability setting method is more accurate than the first reliability setting method.

<Description of Hard Decision Fuzzy Extractor and Conventional Soft Decision Fuzzy Extractor as Comparative Examples>

The following describes a hard decision fuzzy extractor and a conventional soft decision fuzzy extractor as comparative examples. The following also studies the error correcting capabilities or the like of the fuzzy extractor relating to the embodiment of the invention, and those of the hard decision fuzzy extractor and conventional soft decision fuzzy extractor introduced as comparative examples.

<Description of Hard Decision Fuzzy Extractor as Comparative Example>

The fuzzy extractor shown in FIG. 7 can be a hard decision fuzzy extractor of a comparative example.

The error correction codes used for the decision is first-order Reed-Muller codes (RM codes). This type of codes is relatively simply structured and enables efficient encoding. The present embodiment is described under an assumption that a small-scale RM(8, 4, 4) code is used among the first-order RM codes. According to this code, 4 information bits is used to generate an 8-bit codeword, and codewords have at least 4-bit humming distance (HD). The present embodiment is thus capable of correcting an error in 1 of 8 bits with an entropy of 4 bits. To use the RM(8,4,4) code, the probability that an 8-bit PUF response includes n error bits was calculated. Decoding is further described with reference to the Reed-Muller (RM) codes. As mentioned above, the RM(8,4,4) code is taken as an example. The length of the code is 8 bits, and the entropy is 4 bits. Thus, $2^4=16$ (when the 8 bits are fully used, $2^8=256$) codes are used, and the minimum humming distance (HD) for all of the codes is 4 bits.

The base vector of the RM(8,4,4) code to be used is represented by the following expression.

$$\vec{\alpha}_1 = 1\ 1\ 1\ 1\ 1\ 1\ 1\ 1$$
$$\vec{\alpha}_2 = 1\ 1\ 1\ 1\ 0\ 0\ 0\ 0$$
$$\vec{\alpha}_3 = 1\ 1\ 0\ 0\ 1\ 1\ 0\ 0$$
$$\vec{\alpha}_4 = 1\ 0\ 1\ 0\ 1\ 0\ 1\ 0 \qquad \text{Expression 4}$$

For the 4-bit information a1, a2, a3 and a4, the RM codes is represented by the following expression.

$$\vec{v} = a_1\vec{\alpha}_1 + a_2\vec{\alpha}_2 + a_3\vec{\alpha}_3 + a_4\vec{\alpha}_4 \qquad \text{Expression 5}$$

Figure 31:
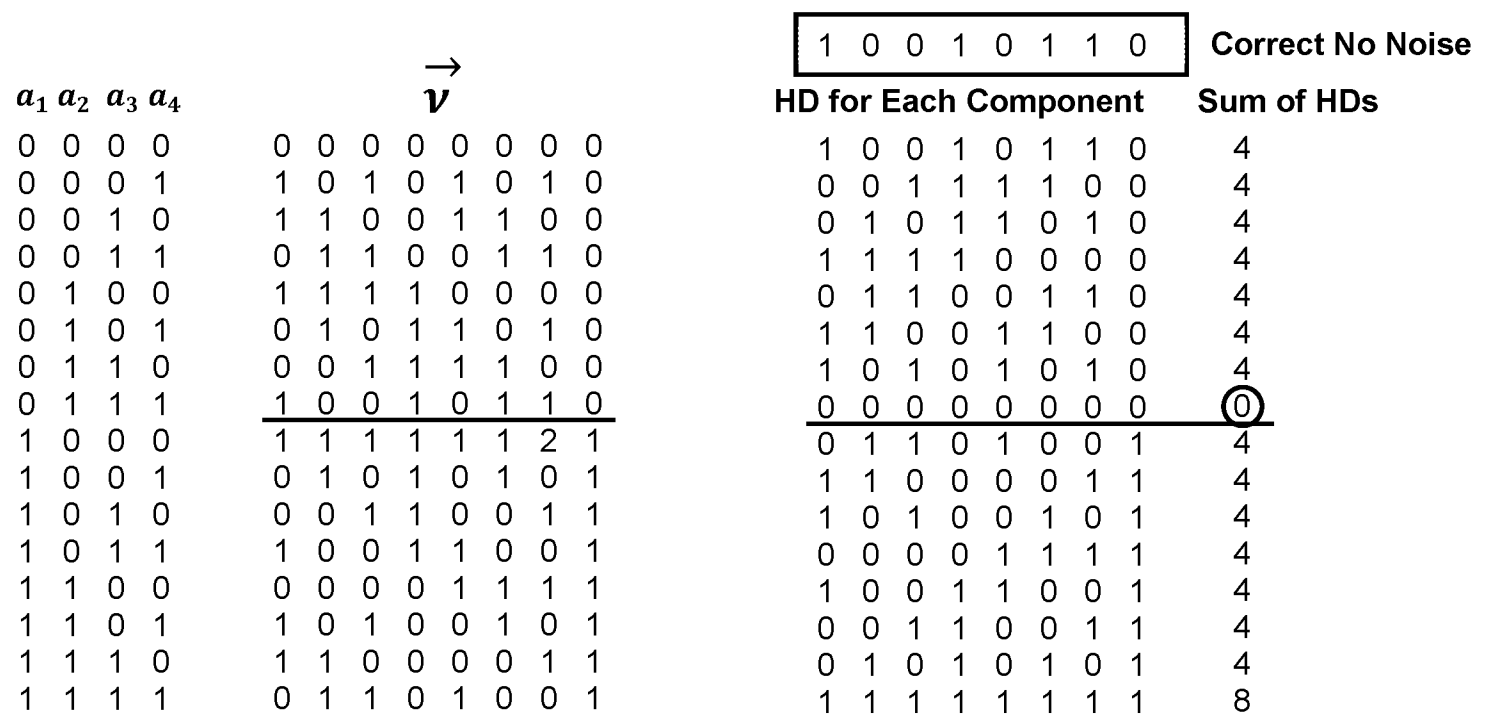

The RM codes are assigned to all of the four bits as shown in FIG. 31.

Figure 32:
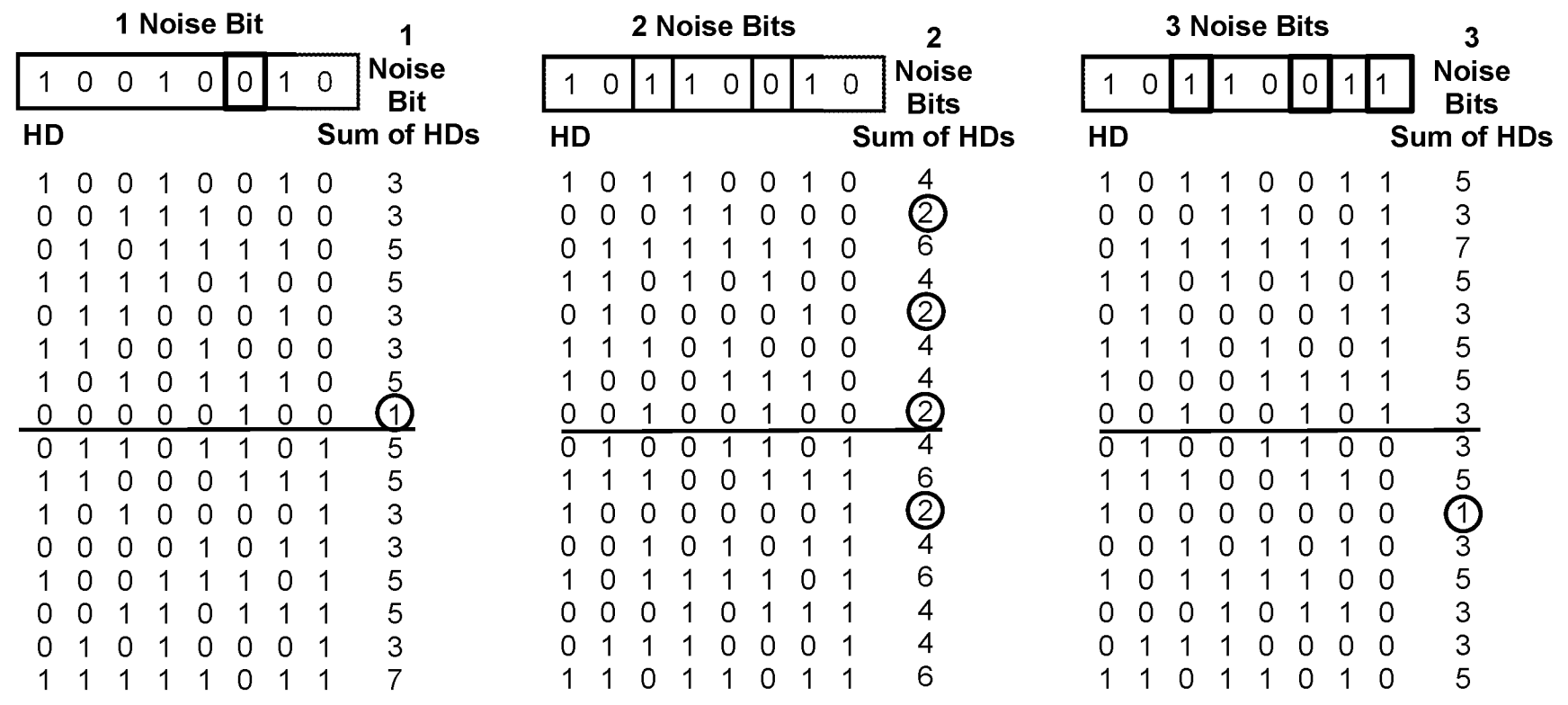

FIG. 32 shows the humming distance (HD) between the code of a regenerated response containing noise and the other codes. If the code has noise in one bit, the HD between the code and the original correct code takes the smallest value. The code can be judged as the true code. If the code has noise in two bits, there are a plurality of candidates exhibiting a HD of 2. Thus, the true code cannot be decided. If the code has noise in three bits, the smallest HD is found between the code and a different code. Thus, a wrong decision is made. For the reasons stated above, the RM(n, k,d) code can perform regeneration successfully as long as noise (inversion) is in d/2-1 bits or less.

<Description of Conventional Soft Decision Fuzzy Extractor as Comparative Example>

The following describes a conventional soft decision fuzzy extractor as a comparative example.

A conventional soft decision fuzzy extractor acquires a response multiple times in advance for initial key generation and acquires reliability information and response data generated with the highest probability by majority decision.

Figure 27:
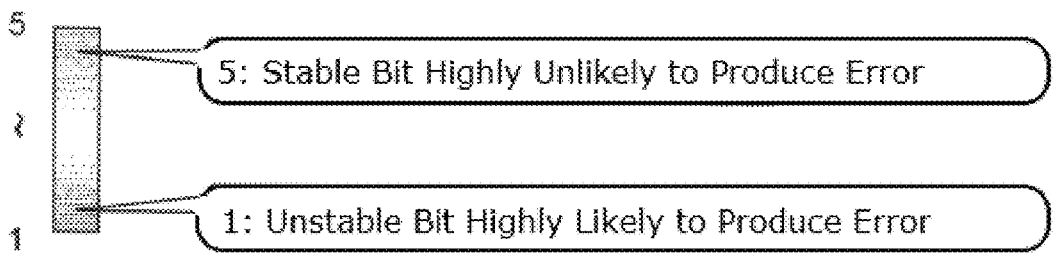
FIG. 27 is used to illustrate correlation decoding, which uses reliability to make decision.

FIG. 27 is used to illustrate correlation decoding that uses reliability to make decision. The following describes correlation decoding that uses reliability to make decision with reference to FIG. 27.

According to this correlation decoding, in advance, low reliability (small weight) is assigned to a bit that is likely to cause an error, and high reliability is assigned to a bit that is unlikely to cause an error. Before reliability is assigned to a bit, the component of the bit is changed from 1 to −1 or 0 to +1. Based on the resulting components, calculations are performed. Instead of selecting a codeword that produces the smallest humming distance (HD) from candidates, an inner product is calculated between a candidate codeword and a vector with reliability, and a codeword that produces the largest result is selected as the correct codeword. In the drawing, the expressions using (x) represent multiplication between the components.

For example, when the correct codeword is (+1, −1, +1, −1) or (+1, +1, +1, +1) and an output including errors is (+1, +1, +1, +1), both of the candidates produce an HD of 1 bit and it cannot be decided which one is the correct codeword without reliability information. If, however, data (+5, +1, +5, −5), which indicates that the second bit is highly likely to cause error, is given as reliability, the codeword (+1, −1, +1, −1), in which the second bit is erroneous, can be determined to be the correct codeword.

The following describes correlation decoding performed when soft decision is made. As described above, the codes are converted such that 0 is replaced with 1 and 1 is replaced with −1 in order to calculate an inner product later. As shown in FIG. 33, a small weight is assigned to a bit that is likely to be inverted, and a large weight is given to a bit that is unlikely to be inverted. The acquired codes are weighted, inner products are calculated between the codes, and the code with the highest inner product is decided to be the correct code.

In the examples shown in FIGS. 33 and 34, the true code can be found even if three bits are inverted at most. The inverted bits make negative contribution to the calculation of the inner product. The contribution made by the bits likely to be inverted, however, have a small weight. Thus, the negative-contribution is small relative to the positive contribution made by the not-inverted-bits. Accordingly, the true code is highly likely to take the largest inner product.

The above conventional approach has higher correction capability than ordinary hard decision fuzzy extractor, but requires reliability information to be preserved in helper data. Therefore, the preserved data disadvantageously occupies an increased capacity.

On the other hand, the fuzzy extractor 820B relating to the second embodiment, which is configured to make soft decision and employs reliability information Q when a key is regenerated and thus has high correcting capability, can estimate, each time the CIS-PUF generates a PUF response, whether a bit is unstable based on the difference between the average outputs (ΔVout) of the corresponding source follower transistors SF-Tr at the same time. With these characteristics, the CIS-PUF can produce reliability with a single attempt (single image). For this reason, unlike a conventional soft decision fuzzy extractor, the fuzzy extractor 820B does not necessarily need to generate large-size helper data with reliability when generating an initial key and alternatively can generate a PUF response with reliability each time a key is regenerated. Furthermore, the reliability can allow the fuzzy extractor 820B to have higher correcting capability than a hard decision fuzzy extractor.

<Evaluation based on Actual Data>

The following shows the evaluation of the error correcting capability based on the results of correcting actual data containing error bits. The following first mentions the ratio of error bits in a response and then describes the correcting capability achieved for each number of error bits in a response.

<Actual Data and Error Bit Analysis>

In order to apply the novel soft decision fuzzy extractor relating to the embodiment to a CIS-PUF, the actually achieved correcting capability is evaluated using actual data. As the actual data, output data from five chips corresponding to 100 attempts (100 images) was prepared. For the evaluation, as described above, first-order Reed-Muller codes (RM codes) are used by the soft decision fuzzy extractor as the error correction codes. This type of codes is relatively simply structured and enables efficient encoding. Therefore, first-order Reed-Muller codes are suitably used to examine the fuzzy extractor. Here, a small-scale RM(8,4,4) code is used from among first-order RM codes. According to this code, 4 information bits is used to generate an 8-bit codeword, and codewords have at least 4-bit humming distance (HD). The code is thus capable of correcting 1 error bit of 8 bits with an entropy of 4 bits. In order to use the RM(8,4,4) code, the probability that a 8-bit PUF response includes n error bits was calculated.

The evaluation is done using 1/0 data having random noise eliminated as much as possible, which is generated by superimposing output data of 100 attempts on a PUF response used to generate an initial key, which is a reference response. The humming distance (HD) between this reference data and the 1/0 data produced using each one of the 100 images is calculated to obtain the number of error bits. In order to calculate the error bits included in every 8 bits, a response of 1,920×270 bits from one chip is partitioned every 8 bits or into 64,800 blocks, and the calculation is performed on 5 (chips)×64,800 (blocks)×100 (attempts) =approximately 32 M.

Figure 28:
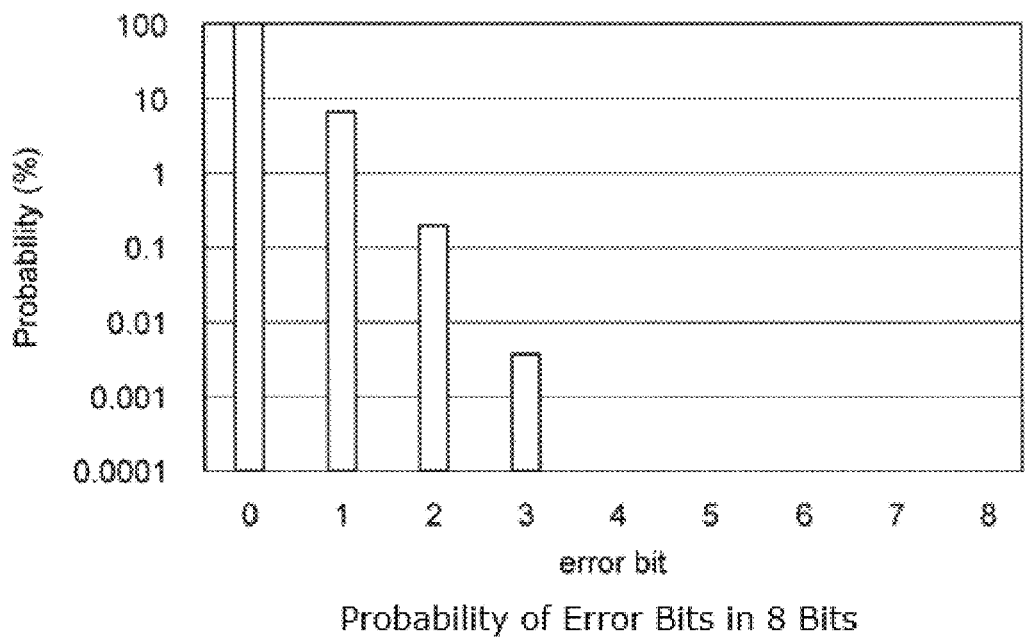
FIG. 28 shows the result of measuring error bits.

FIG. 28 shows the result of measuring error bits. As is shown in FIG. 28, when a CIS-PUF response is partitioned every 8 bits, the number of error bits is 0 or 1 in most of the blocks and is at most three.

<Error Correcting Capability When Novel Soft Decision Fuzzy Extractor of Second Embodiment is Used>

A response resulting from the above-described error bit analysis for one image or attempt is actually fed to the fuzzy extractor and it is confirmed whether correction is successfully performed.

Figure 29:
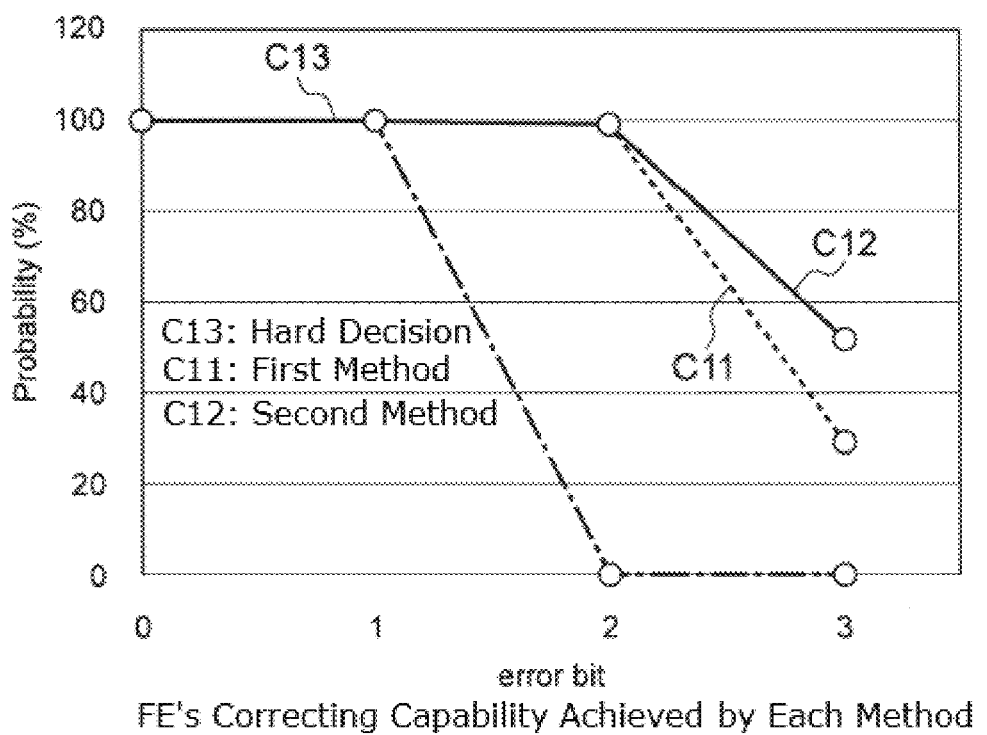
FIG. 29 illustrates the capability of correcting errors for the first and second methods of setting reliability relating to the embodiment and that of a comparative example or a method of making decision using a common hard decision fuzzy extractor.

FIG. 29 illustrates the error correcting capability of the first and second methods of setting reliability relating to the second embodiment and that of a comparative example or a determining method using a common hard decision fuzzy extractor. A response was fed to three types of fuzzy extractors, namely, a hard decision fuzzy extractor and fuzzy extractors employing the first and second reliability setting methods relating to the present embodiment. FIG. 29 shows the probability of successful correction when 8 bits includes n error bits. In FIG. 29, a characteristic curve C11 represents how the error bits is related to the probability when the first reliability setting method is employed, a characteristic curve C12 represents how the error bits is related to the probability when the second reliability setting method is employed, and a characteristic curve C13 represents how the error bits is related to the probability, when the hard decision method, which is a comparative example, is employed.

FIG. 29 reveals that the hard decision method is only capable of correcting 1 error bit but that the novel soft decision methods relating to the present embodiment can achieve improved correcting capability. The novel soft decision fuzzy extractors can almost certainly correct two error bits when employing the RM(8, 4, 4) code, which can only correct one error bit at most when used in the hard decision and even achieves success in correcting 3 error bits with some probability. Furthermore, it has been proved that the second reliability setting method can achieve improved correcting capability when taking into consideration the shift of the first difference ΔVout_get caused by random noise, when compared with the case where the shift is not taken into consideration. According to the results shown in FIG. 29, there is still a concern about the correcting capability for three error bits. However, the probability of the error bits included in the 8 bits of the CIS-PUF response shown in FIG. 28 can suggest that the novel soft decision fuzzy extractor relating to the second embodiment may fail to correct the error bits but can regenerate a correct key by repeatedly performing the key regeneration multiple times.

As described above, the soft decision fuzzy extractor 820 relating to the second embodiment, which exhibits high correcting capability due to the reliability information Q used to regenerate a key, can estimate whether a bit is unstable based on the difference in average output between the source follower transistors SF-Tr corresponding to the bit each time the CIS-PUF generates a PUF response. With these characteristics, the CIS-PUF can produce reliability with a single attempt (single image). For this reason, unlike a conventional soft decision fuzzy extractor, the fuzzy extractor 820B does not necessarily need to generate large-size helper data with reliability when generating an initial key and alternatively can generate a PUF response with reliability each time a key is regenerated. Furthermore, the reliability can allow the fuzzy extractor 820B to have higher correcting capability than a hard decision fuzzy extractor.

As described above, the second embodiment does not need to append reliability to helper data or measure more than one response to acquire reliability information, can thus prevent an increase in the stored data in the fuzzy extractor when an initial key is generated, can generate unique and highly confidential response data and resultantly can certainly prevent forgery and falsification of images.

According to the above-described example, the key generating part 82 generates a unique key based on the variation information of the pixels or reading circuit 40. The key generating part 82 can be also configured to generate unique keys based on different pieces of variation information and perform a logical operation between the generated unique keys to acquire a final unique key. For example, the following configuration is also possible.

The key generating part 82 has a first function of generating a first unique key using variation information of the ADC 41, the amplifier (AMP) 42, or the S/H circuit 43 of the reading circuit 40 and a second function of generating a second unique key using the output from the SRAM of the column memory 45 of the reading circuit 40, and performs a logical operation on the first unique key generated by the first function and the second unique key generated by the second function to generate a final unique key.

The above configuration is also applicable to the pixel variation information.

The integrating part 85 may be configured to have a function of hierarchically masking the image using the key information to be integrated. Alternatively, the integrating part 85 may be configured to have a function of embedding an electronic watermark in the image using the key information to be integrated.

In the present embodiment, the individual constituents of the solid-state imaging device 10 can be contained in the same package.

When the Silicon in Package (SiP) is employed to seal the solid-state imaging device (CIS) 10 and an image signal processor (ISP) in the same package, the signal processing to generate keys and identification data may be completed within the package, so that the identification data can be generated without outputting the unique key data outside the package.

When the System on Chip (SoC) is used to include an image sensor and a signal processing circuit in the same chip, the signal processing to generate keys and identification data is completed within the chip, so that the identification data can be generated without outputting the unique key data outside the chip.

The solid-state imaging device 10 relating to the embodiment can be configured to have driving timing to accumulate leak current and the like over a long duration, independently from normal reading driving timing, as described above. The full-scale voltage of the analog amplifier, digital amplifier or ADC may be reduced, and the accumulated leak voltage may be exaggerated and output. Furthermore, data resulting from a plurality of rows or frames may be averaged or added together to reduce the random noise component.

As the variation information CFLC of the constituent circuit of the reading circuit 40, the information acquiring part 81 can employ the variation information of the ADC. Alternatively, as the variation information CFLC of the constituent circuit of the reading circuit 40, the information acquiring part 81 can employ the variation information of the amplifier (AMP). As another alternative, the information acquiring part 81 can employ variation information of the S/H circuit as the variation information CFLC of the constituent circuit if the reading circuit 40. Furthermore, the information acquiring part 81 can employ output (variation) information of the SRAM of the column memory, as the variation information CFLC of the constituent circuit of the reading circuit 40.

The solid-state imaging devices 10 and 10A described above can be applied, as an imaging device, to electronic apparatuses such as digital cameras, video cameras, mobile terminals surveillance cameras, and medical endoscope cameras.

Figure 30:
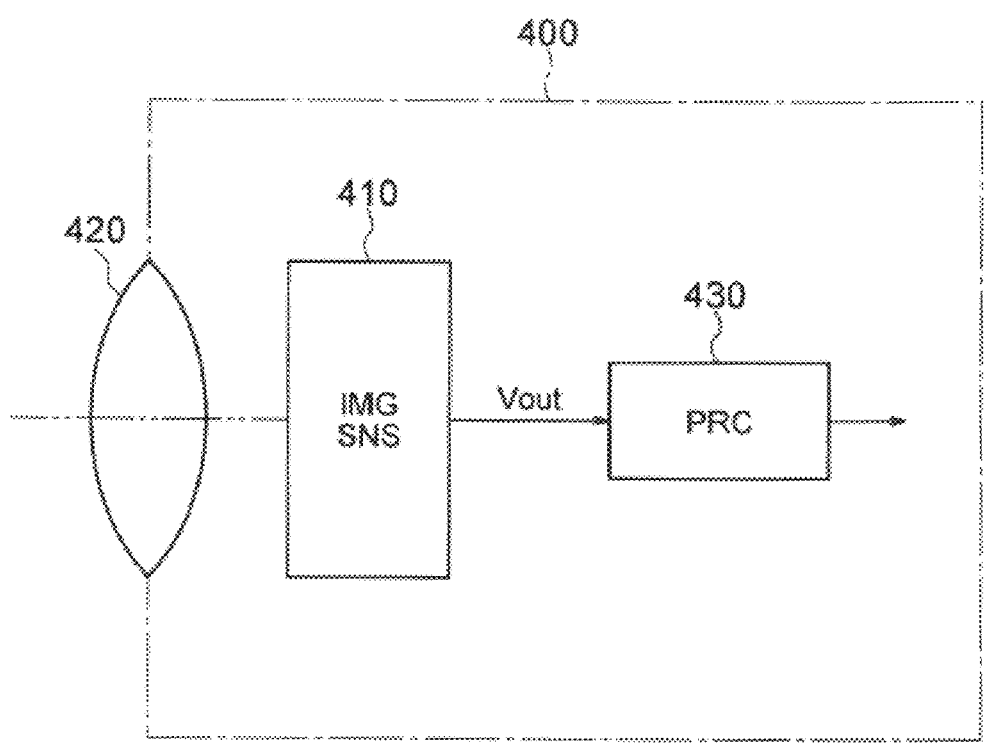
FIG. 30 shows an example configuration of an electronic apparatus to which the solid-state imaging devices relating to the embodiments of the present invention can be applied.

FIG. 30 shows an example of the configuration of an electronic apparatus including a camera system to which the solid-state imaging devices according to the embodiments of the present invention are applied.

The electronic apparatus 400 includes a CMOS image sensor (IMGSNS) 410, which can be configured based on the solid-state imaging devices 10 and 10A relating to the embodiments of the invention, as shown in FIG. 30. Further, the electronic apparatus 400 includes an optical system (such as a lens) 420 for redirecting the incident light to pixel regions of the CMOS image sensor 410 (to form a subject image). The electronic apparatus 400 includes a signal processing circuit (PRC) 430 for processing output signals of the CMOS image sensor 410.

The signal processing circuit 430 performs predetermined signal processing on the output signals of the CMOS image sensor 410. The image signals processed in the signal processing circuit 430 can be handled in various manners. For example, the image signals can be displayed as a video image on a monitor having a liquid crystal display, or the image signals can be printed by a printer or recorded directly on a storage medium such as a memory card.

As described above, a high-performance, compact, and low-cost camera system can be provided that includes the solid-state imaging device 10, 10A as the CMOS image sensor 410. Further, it is possible to produce electronic apparatuses such as surveillance cameras and medical endoscope cameras that are used for applications where cameras are required to be installed under restricted conditions such as the installation size, number of connectable cables, cable length, and installation bulk.

What is claimed is:

1. A solid-state imaging device comprising:
   a pixel part having a plurality of pixels arranged in a matrix pattern, the pixels having a photoelectric converting function;
   a reading part for reading a pixel signal from the pixel part; and
   a response data generating part including a fuzzy extractor, the response data generating part generating response data including a unique key in association with at least one selected from the group consisting of variation information of the pixels and variation information of the reading part, wherein the fuzzy extractor includes:
   an initial key generating part including a true random number generator arranged to correspond to a column output from the pixel part or a pixel signal read from the pixels by the reading part in a true random number generation mode, the true random number generator generating a true random number using a read-out signal read from a column signal processing part of the reading part, the column signal processing part processing a column output signal input thereto, the initial key generating part generating an initial key and helper data based on the true random number generated by the true random number generator and based on the variation information acquired as a response when the initial key is generated; and
   a key regenerating part for generating, when a key is regenerated, a unique key based on the helper data acquired by generating the initial key and based on variation information acquired as a response including an error when the key is regenerated.

2. The solid-state imaging device according to claim 1, wherein the pixels have:
   a photoelectric conversion element for storing therein, in a storing period, charges generated by photoelectric conversion;
   a transfer element for transferring, in a transfer period, the charges stored in the photoelectric conversion element;
   a floating diffusion (FD) to which the charges stored in the photoelectric conversion element are transferred through the transfer element;
   a source follower element for converting the charges in the floating diffusion into a voltage signal with a gain determined by the quantity of the charges; and
   a reset element for resetting the floating diffusion to a predetermined potential, and
   wherein the pixel signal read from the pixels by the reading part in the true random number generation mode includes:
   a signal containing FD reset noise observed while the reset element is in a conduction state; or
   a signal containing FD reset noise observed while the reset element and the transfer element are in a conduction state.

3. The solid-state imaging device according to claim 2, wherein the pixel part has a pixel sharing configuration in such a manner that one floating diffusion, one source follower element and one reset element are shared between a plurality of photoelectric conversion elements and a plurality of transfer elements.

4. The solid-state imaging device according to claim 2, wherein a clip circuit is provided at an end of an array of the pixels for limiting a pixel output voltage amplitude.

5. The solid-state imaging device according to claim 1, wherein the reading part reads the pixel signal or the read-out signal multiple times in the true random number generation mode.

6. The solid-state imaging device according to claim 5, wherein the reading part reads the pixel signal from a selected one of the pixels multiple times.

7. The solid-state imaging device according to claim 5, wherein the reading part reads the pixel signal from a plurality of pixels in a selected row.

8. The solid-state imaging device according to claim 5, wherein the reading part reads the pixel signal from a plurality of pixels in a selected column.

9. The solid-state imaging device according to claim 8, wherein the reading part includes:

a plurality of column signal processing parts each arranged to correspond to at least one column output from the pixel part, each column signal processing part processing a column output signal input thereto; and a multiplexer for shuffling destinations of column output signals of column outputs from the pixel part such that a given column output signal of a given column output is input into a column signal processing part different from an intended column signal processing part arranged to correspond to the given column output.

10. The solid-state imaging device according to claim 2, wherein a pixel to be read in the true random number generation mode is selected from pixels arranged in an optical black region.

11. The solid-state imaging device according to claim 1, wherein a column signal processing part of the reading part includes:
an amplifier for amplifying a read-out signal from the pixels; and
an analog-to-digital (AD) converter for analog-to-digital converting an output signal from the amplifier, and
wherein a read-out signal from the column signal processing part of the reading part includes:
an output signal from the AD converter while no read-out signal is input from the pixels into the amplifier and while no output is input into the AD converter from the amplifier; or
an output signal from the AD converter while no read-out signal is input from the pixels into the amplifier and while output from the amplifier is input into the AD converter.

12. The solid-state imaging device according to claim 1, wherein the true random number generator performs an exclusive logical OR operation on a plurality of pixel signals or a plurality of read-out signals.

13. The solid-state imaging device according to claim 1, wherein, in the fuzzy extractor, the initial key generating part generates the initial key and the helper data based on the variation information acquired as a response when the initial key is generated, and when a key is regenerated, the key regenerating part generates a unique key in a soft-decision manner using the helper data acquired by generating the initial key, variation information acquired as a response including an error when the key is regenerated, and reliability information determined based on the variation information when the key is regenerated.

14. A method for driving a solid-state imaging device, the solid-state imaging device including:
a pixel part having a plurality of pixels arranged in a matrix pattern, the pixels having a photoelectric converting function; and
a reading part for reading a pixel signal from the pixel part,
wherein the method comprises steps of:
acquiring at least one selected from the group consisting of variation information of the pixels and variation information of the reading part; and
generating response data including a unique key in association with the variation information acquired in the acquiring step, the response data generating step including fuzzy extraction performed using a fuzzy extractor, and
wherein the fuzzy extraction included in the response data generating step includes steps of:
generating an initial key and helper data, the initial key generating step including a step of generating a true random number using a read-out signal read from a column signal processing part of the reading part, the column signal processing part processing a column output signal input thereto, by a true random number generator arranged to correspond to a column output from the pixel part or a pixel signal read from the pixels by the reading part in a true random number generation mode, the initial key and the helper data being generated based on the true random number generated in the true random number generating step and based on the variation information acquired as a response when the initial key is generated; and
when a key is regenerated, generating a unique key based on the helper data acquired by generating the initial key and based on variation information acquired as a response including an error when the key is regenerated.

15. An electronic apparatus comprising:
a solid-state imaging device; and
an optical system for forming a subject image on the solid-state imaging device,
wherein the solid-state imaging device includes:
a pixel part having a plurality of pixels arranged in a matrix pattern, the pixels having a photoelectric converting function;
a reading part for reading a pixel signal from the pixel part; and
a response data generating part including a fuzzy extractor, the response data generating part generating response data including a unique key in association with at least one selected from the group consisting of variation information of the pixels and variation information of the reading part, and
wherein the fuzzy extractor includes:
an initial key generating part including a true random number generator arranged to correspond to a column output from the pixel part or a pixel signal read from the pixels by the reading part in a true random number generation mode, the true random number generator generating a true random number using a read-out signal read from a column signal processing part of the reading part, the column signal processing part processing a column output signal input thereto, the initial key generating part generating an initial key and helper data based on the true random number generated by the true random number generator and based on the variation information acquired as a response when the initial key is generated; and
a key regenerating part for generating, when a key is regenerated, a unique key based on the helper data acquired by generating the initial key and based on variation information acquired as a response including an error when the key is regenerated.

\* \* \* \* \*